(12) United States Patent
Lucas et al.

(10) Patent No.: US 8,689,171 B2
(45) Date of Patent: Apr. 1, 2014

(54) SYSTEM AND METHOD FOR MANAGING RESOURCES USING A COMPOSITIONAL PROGRAMMING MODEL

(75) Inventors: Bruce David Lucas, Mohegan Lake, NY (US); Rahul P. Akolkar, Tuckahoe, NY (US); Charles F. Wiecha, Hastings-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1167 days.

(21) Appl. No.: 12/106,690

(22) Filed: Apr. 21, 2008

(65) Prior Publication Data

US 2009/0265686 A1 Oct. 22, 2009

(51) Int. Cl.
*G06F 9/44* (2006.01)

(52) U.S. Cl.
USPC .......................................................... 717/104

(58) Field of Classification Search
USPC .................. 707/610–633, 927; 717/104–105, 717/114–117, 120, 123, 126
See application file for complete search history.

(56) References Cited

U.S. PATENT DOCUMENTS

| | | | |
|---|---|---|---|
| 5,195,172 A | 3/1993 | Elad et al. | |
| 5,835,683 A | 11/1998 | Corella et al. | |
| 6,463,442 B1 * | 10/2002 | Bent et al. | 719/332 |
| 6,996,800 B2 | 2/2006 | Lucassen et al. | |
| 7,028,306 B2 | 4/2006 | Boloker et al. | |
| 2003/0115375 A1 * | 6/2003 | Robison | 709/318 |
| 2006/0041661 A1 * | 2/2006 | Erikson et al. | 709/225 |
| 2006/0069628 A1 * | 3/2006 | Le et al. | 705/28 |
| 2006/0212474 A1 * | 9/2006 | McCormack et al. | 707/103 Z |
| 2007/0033659 A1 * | 2/2007 | Hoche et al. | 726/28 |
| 2008/0120594 A1 * | 5/2008 | Lucas et al. | 717/105 |
| 2009/0234791 A1 * | 9/2009 | Delmonico et al. | 706/50 |

OTHER PUBLICATIONS

Lucas, B. et al., "Collage: A Declarative Programming Model for Compositional Development of Web Applications", HCII 2009, Jul. 2009. pp. 856-865.*
Agha et al.; "A Foundation for Actor Computation"; J. Functional Programming 1 (1):1-000, Jan. 1993; 59 pages.
Bonner "Workflow, Transaction and Datalog"; Proceedings of the 18th ACM Symposium on Principles of Database Systems (PODS) May 31-Jun. 2, 1999; 67 pages.
Bernard Houssais, "The Synchronous Programming Language Signal A Tutorial", IRISA. Espresso Project; Apr. 15, 2002; 48 pages.
Dong et al., "Nonrecursive Incremental Evaluation of Datalog Queries", Database Theory—ICDT' 92, 4th Int'l Conf.; Germany, 1992; revised May 1994; 35 pages.
http://www.flapjax-lang.org/tutorial/; printed May 30, 2007; 10 pages.

(Continued)

*Primary Examiner* — Ajay Bhatia
*Assistant Examiner* — Randall Burns
(74) *Attorney, Agent, or Firm* — Tutunjian & Bitetto, P.C.; Daniel P. Morris

(57) ABSTRACT

A system and method for managing resources in a programming environment includes providing mutable entities including related data including triples, listening for changes in the related data, and triggering a first construct in accordance with the changes in the related data to update the mutable entities. Updates are propagated from the first construct to other constructs such that a cascade of updates occurs. The cascade of updates is executed concurrently such that the updates are propagated to completion and are executed all at once relative to other cascades of executing constructs.

20 Claims, 14 Drawing Sheets

(56) References Cited

OTHER PUBLICATIONS

Harris et al., Composable Memory Transactions: Post-publication version: Aug. 18, 2006; PPoPP '05; 13 pages.
Halbwachs et al., "A Tutorial of LUSTRE", This Document is an introduction to the language LUSTRE-V4; Jan. 24, 2002; 26 pages.
Bray et al., Extensible Markup Language (XML) 1.0 (Fourth Edition), Aug. 16, 2006: http://www.w3.org/TR/2006/REC-xml-20060816; 2006; 42 pages.
Manola et al., RDF Primer, W3C Recommendation; Feb. 10, 2004; http://www.w3.org/TR/2004/REC-rdf-primer-20040210/; 2004; 78 pages.
Clark et al., XML Path Language (XPath) Version 1.0; W3C Recommendation, Nov. 16, 1999; http://www.w3.org/TR/1999/REC-xpath-19991116; 1999; 33 pages.
Boyer et al., XForms 1.0 (Second Edition) W3C Recommendation, Mar. 14, 2006; http:www.w3.org.TR.2006/REC-xforms-20060314/; 2006; 126 pages.
Lucas et al., System and Method for Managing Resources Using a Compositional Programming Model; U.S. Appl. No. 11/756,707, filed Jun. 1, 2007; 57 pages.
Fielding, "Architectural Styles and the Design of Network-based Software Architectures", PhD thesis, University of California, 2000; 180 pages.
Kiczales, et al., "Aspect-Oriented Programming" ACM Computing Surveys 28, 4es; 1996; 14 pages.
Liu, "Extending Datalog with Declarative Updates", Journal of Intelligent Information Systems; 2002; 23 pages.
Milner, et al., "A Calculus of Mobile Processes, Part I", Information and Computation 100, 1990; 46 pages.
Milner, et al., "A Calculus of Mobile Processes, Part II", Information and Computation 100, 1990; 41 pages.
Harel, D., et al., Statemate: A Working Environment for the Development of Complex Reactive Systems; IEEE; 1998; 11 pages.
Topor, "Safe Database Queries with Arithmetic Relations" Proc. of the14th Australian Computer Science Conference; 1991; 12 pages.
Wang, X. "Negation in Logic and Deductive Databases" PhD Thesis; University of Leeds; 1999; 180 pages.
Berry, et al., "The Esterel Synchronous Programming Language: Design, Semantics, Implementation", Science of Computer Programming; 1992; 51 pages.
Cooper, et al., "Links: Web Programming without Tiers", ESOP; Nov. 2007; 12 pages.
Caspi, et al., "LUSTRE: A Declarative Language for Programming Synchronous Systems", 1986; POPL1987; 11 pages.
Paton, et al., "Active Database Systems", ACM Computer Survey 31, Jan. 1999; 47 pages.

\* cited by examiner

*every resource of class DATE has a yr, mo.
and data resources as its value*

```
<c:with anchor="DATE">
  <c:create-structure>
    <yr/>
    <mo/>
    <da/>
  </c:create-structure>
</c:with>
```

*classify every DATE resource as a DATE3
resource as well*

```
<c:let anchor+"DATE"class="DATE3"/>
```

*every DATE3 resource has three associated input
fields whose values are bound to the yr, mo, da values*

```
<c:with anchor="DATE3">
  <c:create-view class="c:INPUT" ref="yr" >
    <c::out path="c:label">year</c:out>
  </c:create-view>
  <c:create-view class="c:INPUT" ref="mo" >
    <c:out path="c:label">month</c:out>
  </c:create-view>
  <c:create-view class ="c:INPUT" ref="da" >
    <c:out path="c:label">day</c:out>
  </c:create-view>
</c:with>
```

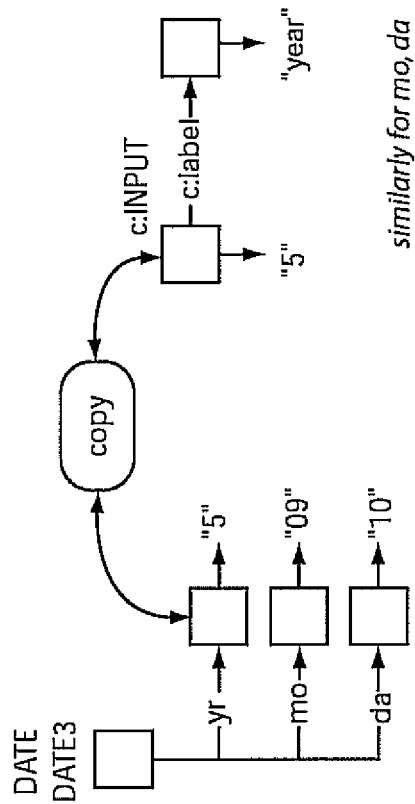

SYSTEM AND METHOD FOR MANAGING RESOURCES USING A COMPOSITIONAL PROGRAMMING MODEL

CROSS-REFERENCE TO RELATED APPLICATIONS

This application is related to application Ser. No. 11/756,707, filed on Jun. 1, 2007 and application Ser. No. 12/047,385 filed on Mar. 13, 2008, which are both herein incorporated by reference in their entirety.

BACKGROUND

1. Technical Field

The present invention relates to programming models and more particularly to systems and methods for data-oriented programming models for loosely coupled applications.

2. Description of the Related Art

While the trend towards loosely-coupled inter-networked software is inexorable, programming models and runtime systems are largely designed for building monolithic, free-standing applications. While the web has vastly increased the scale of distribution, web applications are currently programmed and deployed in a manner not that different from mainframe applications of the 1960s.

The mismatch between programming models/runtimes, and the predominance of inter-networked software is becoming a significant impediment to producing and composing reliable application software in a timely manner—and this mismatch is at the heart of much of the dissatisfaction developers have expressed with the complexity and obscurity of current middleware, programming models, and development tools.

SUMMARY

Present embodiments include a single declarative, data-centric, update-driven, distributed language to support enterprise, web and client applications. A programming model in accordance with the present principles reduces complexity by eliminating multiple redundant abstractions, reduces complexity by facilitating application evolution, and reduces complexity by facilitating flexible deployment and distribution.

An approach to program artifact description that does not impose encapsulation as strictly as in traditional languages is presented. This increases flexibility for subsequent reuse without requiring refactoring or redesign. In one embodiment, resource description framework (RDF) is employed. A declarative data-driven programming model is disclosed for cross-organizational composition, and the attendant distribution of components. The language features support device adaptation and support transformations and mapping among business objects, and between business objects and user interfaces (UI).

A programming model based on the use of resource description framework (RDF) for the data model (distinguished from the normal role of RDF for supporting information ontologies) is provided built on a core subset of RDF including concepts of resource, triple, property, and class, sub-property and sub-class, which also supports distributed data models by using RDF resources identified by URLs (distinguished from RDFs use of the more general URIs to identify resources).

A data model supports multiple and dynamic classification: a resource may have more than one class, and the classification s) of a resource may programmatically changed at runtime. The data model supports use of multiple and dynamic classification for flexible cross-organizational composition of programs and processes, and supports use of multiple and dynamic classification for flexible cross-organizational composition of programs and processes. The data model also supports use of multiple and dynamic classification for user interface definition, and supports use of multiple and dynamic classification for device adaptation.

A programming model is built on the notion of mutable entities with values that may be read, and whose values evolve overtime by being updated. The programming model employs RDF to model mutable entities by introducing into RDF, the concepts of resources with associated values to model mutable entities. The programming model has associated values of a resource R represented by a tree of RDF nodes and RDF triples rooted at R. The programming model has triples representing values of a resource that are distinguished from triples not representing a value of a resource, thus dividing the RDF graph into two groups: those that represent a tree-structured value of some resource; and those that connect resources in a graph structure. The triples comprising the value of R are distinguished from other graph triples by a predicate that is a subproperty of a distinguished property.

A unifying data model for several data models and related execution models in common use including ER, UML, Relational, XML. RDF may be the basis for the unifying data model.

A data centric execution model, wherein aspects of the programming model (including: encapsulation, composition, process description, asynchrony, user interaction, distribution) may be uniformly described in terms of changes of the runtime state of the program. The runtime state of a program comprises a set of resources and triples included in a triple store. A construct such as <bind> is included that declaratively specifies how the value of a mutable entity changes in response to changes in the values of other mutable entities. RDF may be employed to model mutable entities. The programming construct declaratively provides the programmer access to both the old and the new values of its input data. The programming construct declaratively specifies how the value of a mutable entity changes in response to changes in the values of other mutable entities and permits a programmer to declare each input to be active (triggers the execution of the <bind>) or passive (does not trigger the execution of the <bind>, but may be used as input to it).

A programming model may include XQuery, employed as a language to compute output values from input values. The programming model provides a construct that declaratively specifies the creation of new mutable entities based on current entity values. The programming model may provide a construct that declaratively relates new and existing mutable entities by creating and destroying triples based on current entity values. The programming model may use RDF resources to represent mutable entities. The programming model provides a construct that declaratively changes the classification of new and existing mutable entities based on current entity values. The programming model may employ an execution model that is defined in terms of entity updates. An update is the assignment of a value to an entity.

Each external event, such as a user input, may be manifested in the programming model as an update to a mutable entity. Each update may declaratively trigger further updates to further entities. The programming model may incorporate path expressions that operate over arbitrary graphs for the purpose of identifying the specific entities whose values are declaratively related. RDF data structures may be used for building applications that may be distributed among multiple computing nodes. Execution may be distributed among multiple computing nodes.

A declarative programming model includes a runtime distribution of data structures, and execution is represented orthogonally from the description of the data structures and execution themselves. Cascaded updates may be performed. Web protocols such as HTTP PUT or POST may be employed for the programming model.

A programming model supports a description of user interfaces, or application "front-ends", at a range of levels of abstraction using a uniform recursive MVC pattern, allowing the developer to refine an abstract user interface description through successive levels of more concrete specification. A model of an instance of the MVC pattern is represented by an RDF resource. A view of an instance of the MVC pattern is a set of resources associated with the model. A controller of MVC is a set of constructs that declaratively update the model resource in response to updates to the view resources, and vice versa.

A method for definition of structure and function associated with classes includes supporting flexible multi-organizational composition and adaptation of applications. A programming model uses multiple classifications to support permitting different organizations to independently specify application behavior in a compositional manner, uses multiple classifications to support flexible decomposition of abstractions represented by classifiable entities, and supports the use of multiple classifications to support cross-organization development and composition by allowing each development team to apply classifications to affect the development team's goals.

Dynamic classification can permit the classifications applied by each development team to be specified at any point in the lifecycle of a program artifact, including: at the time the artifact is first defined by its producer; at the time the program artifacts of two development organizations are composed; or at runtime. The programming model supports composable class definitions, in which all aspects of the definition of a class may be independently specified in separate program artifacts. The programming model uses composable class definitions to allow an application provided by one organization to be adapted for use by a different organization. The programming model permits one organization to insert new elements into a user interface defined by another organization, permits one organization to insert new elements into the data structures defined by another organization, and permits one organization to modify processes defined by another organization.

A programming model that supports flexible device adaptation by interfacing with the models at any level of the uniform recursive MVC tree, thus allowing for a spectrum of device adaptation strategies via a common set of language features.

A system and method for managing resources in a programming environment includes providing mutable entities including related data including triples, listening for changes in the related data, and triggering a first construct in accordance with the changes in the related data to update the mutable entities. Updates are propagated from the first construct to other constructs such that a cascade of updates occurs. The cascade of updates is executed concurrently such that the updates are propagated to completion and are executed all at once relative to other cascades of executing constructs.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 is a diagram showing a compositional model with code and a corresponding graphical representation in accordance with one illustrative embodiment;

DETAILED DESCRIPTION OF PREFERRED EMBODIMENTS

Figure 1:
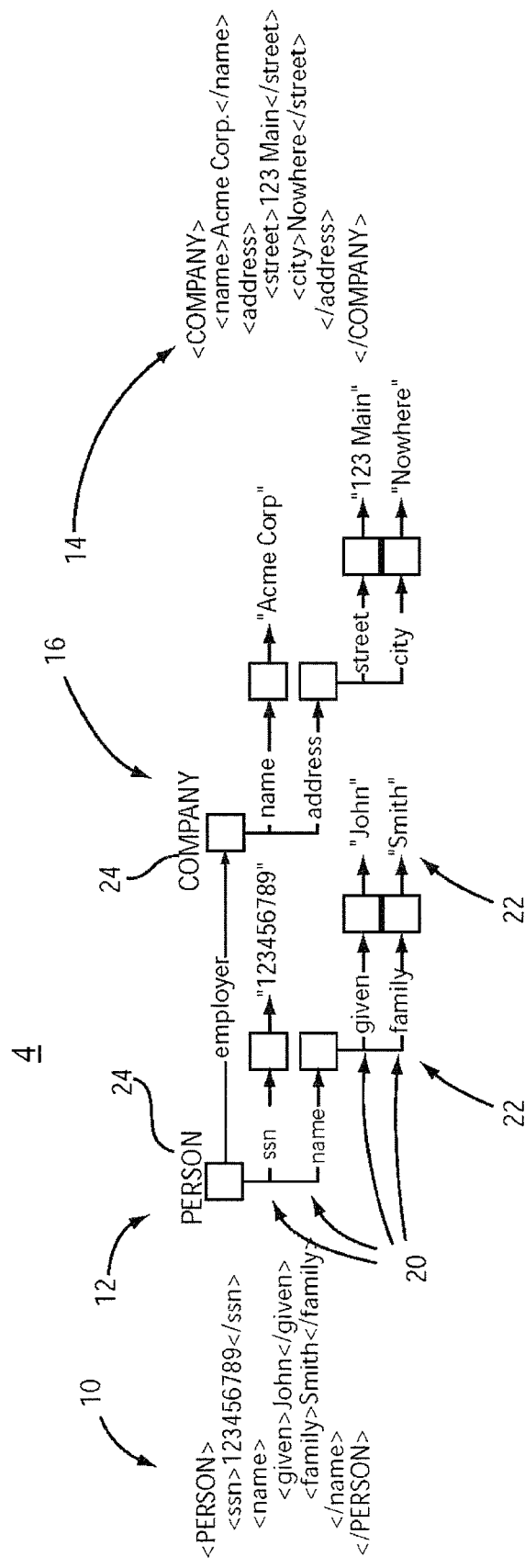
FIG. 1 is a diagram showing two XML documents and corresponding graphical representations for two resource nodes in accordance with one illustrative embodiment.

In accordance with the present principles, a radically simplified declarative programming model and runtime are provided which are expressly targeted at building and deploying cross-organizational software as compositions of web components. In addition, an evolutionary style of software development is supported that permits rapid application prototyping, but also enables progressive refinement of an initial prototype into a hardened asset. A simplified and uniform set of language features addressing end-to-end application design, including business objects, user interaction, and "last-mile" issues such as device adaptation, and multi-modal and multi-device interaction will be described.

In accordance with present embodiments the following advantages may be achieved. A single declarative language is provided to support enterprise, web and client applications, hence reducing complexity from multiple redundant abstractions. A resource description framework (RDF) based approach to the programming model used in accordance with the present principles does not impose encapsulation as strictly as in traditional object-oriented (OO) languages. Cross-organizational composition, and the attendant distribution of components, is easier using declarative data-driven programming models than using procedural or object-oriented languages.

Dealing with the constraints and variety of multiple end-user interaction devices has long been a challenge for user interface (UI) frameworks, whether web based or not. In accordance with the present principles, one contribution to this problem is to approach the problem as a reuse of a uniform set of concepts rather than as an ad-hoc framework addressed specifically to this "last-mile" problem, as has often been the case in the past. We apply the same language features introduced to support transformations and mapping among business objects, and between business objects and the UI, to support device adaptation as well.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A data model in accordance with the present principles is built on a core subset of RDF. The key RDF concepts of resource, triple, property, and class are employed. RDF concepts such as sub-property and sub-class play a role as well. The present embodiments use RDF resources identified by URLs to build a fundamentally distributed data model.

RDF supports multiple and dynamic classification: a resource may have more than one class, and the classification(s) of a resource may programmatically changed at runtime. These features play a role, for such diverse purposes as flexible cross-organizational composition of programs and processes, user interface styling, device adaptation, and so on.

Execution models often center around the notion of mutable entities with values that may be read, and whose values evolve over time by being updated. A data model in accordance with the present principles builds on the RDF model to support such read/update execution models by introducing the concepts of resources with associated values to model mutable entities. The value of a resource R is represented by a tree of nodes and triples rooted at R. The triples comprising the value of R are distinguished from other graph triples by a predicate that is a subproperty of a distinguished property, c:value, defined in accordance with one feature. Thus, graph triples are divided into two groups: those that represent a tree-structured value of some resource; and those that connect resources in a graph structure.

A unifying data model: the present embodiments build on RDF to provide a data model that unifies several data models and related execution models in common use. The following table describes the mapping between present concepts and RDF concepts and each of several popular data models.

TABLE 1

| Collage | RDF | | | |
| --- | --- | --- | --- | --- |
| | Entity-relationship | UML | Relational | XML |
| class | entity class | class | table | — |
| resource | entity instance | object | row | element, attribute |
| value property | attribute | attribute | column | parent-child relationship |
| value tree | composite attribute | — | — | XML (sub-)tree |
| non-value property | relationship | association | PK/FK | — |

XML data: In accordance with the present principles, a value tree associated with a particular resource may be viewed as an XML document, using a mapping consistent with the RDF/XML serialization of RDF. In one embodiment, the uniform resource identifier (URI) of a resource is a uniform resource locator (URL) so that the XML document that represents the value of a resource may be read or updated using HTTP GET and PUT operations with text/xml message bodies.

Referring now to the drawings in which like numerals represent the same or similar elements and initially to FIG. 1, a relational data model 4 is illustratively shown. Relational data model 4 illustratively includes an XML document <PERSON> 10 and its representation 12 and an XML document 14 <COMPANY> and its representation 16 are illustratively shown. Boxes in FIG. 1 represent resource nodes. Lines connecting the boxes in FIG. 1 represent triples. Resources may include triples. Heavy lines are triples that form a value tree of a resource. Class(es) 24 of a resource node are noted above the node.

Relational data: Each row 20 of a database corresponds to a resource whose value is columns 22 of that row. Updating the row corresponds to updating the value tree of the corresponding resource. This is illustrated in the End-to-end example below.

Data relevant to constructs (such as a bid construct) may be determined based on the relationships or features of resource graphs.

Execution model: The present principles include a programming model for building reactive systems. Thus, an execution model in accordance with the present embodiments, defines how the runtime state of a program changes in reaction to the occurrence of external events, such as user inputs, messages from external systems, or asynchronous internal events. The present execution model is data centric, meaning that all aspects of the execution model are described in terms of changes of the runtime state of the program. The execution model will be explained in greater detail with respect to FIG. 2.

Figure 2:
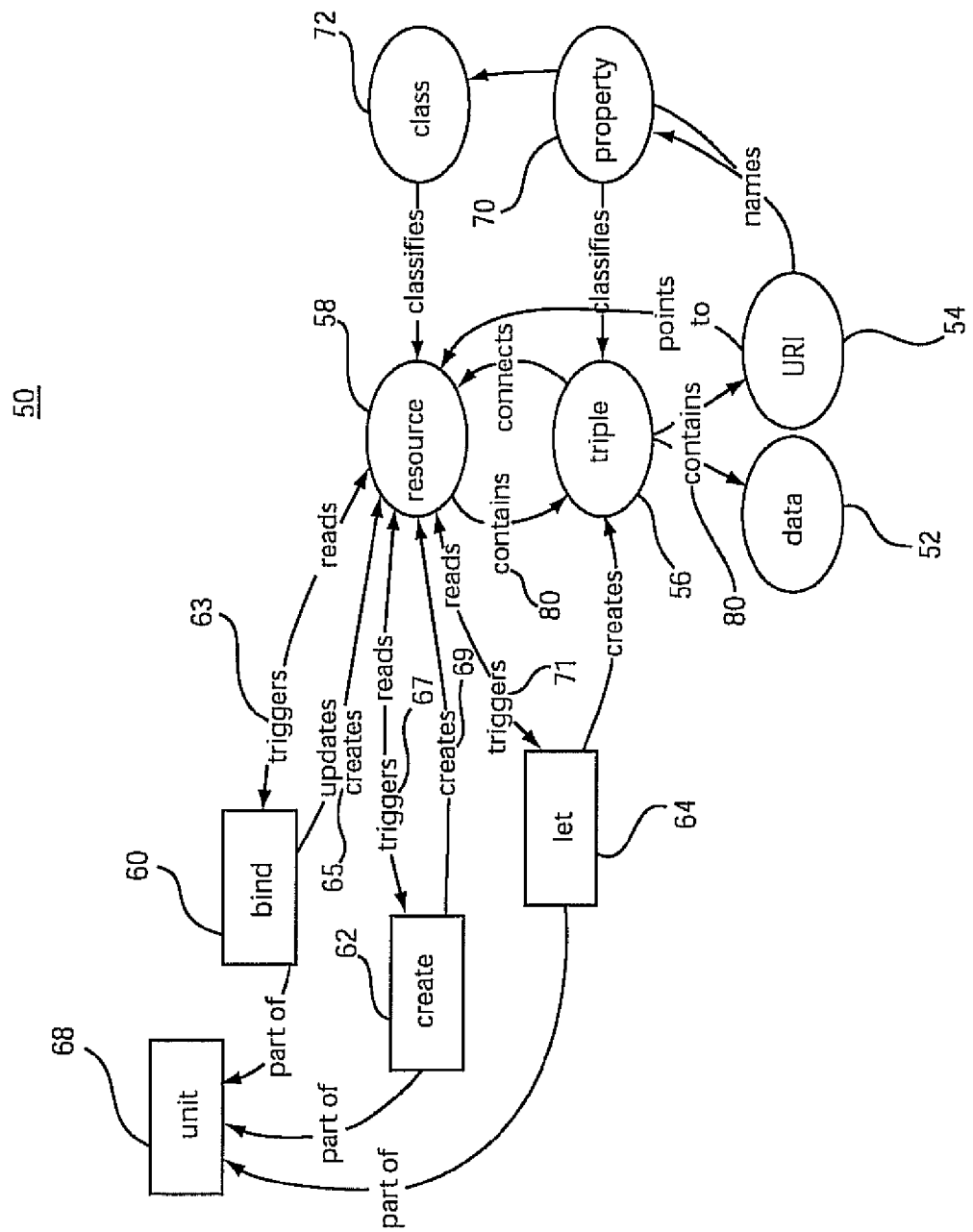
FIG. 2 is a block/flow diagram showing an execution model in accordance with one illustrative embodiment.

Referring to FIG. 2, a block/flow diagram depicts a model execution system/method 50 in accordance with one illustrative embodiment. One or more resources 58 include data 52 which may be connected or associated in triples 56. Data 58 or information for identifying data (e.g., uniform resource identifiers (URI) 54 which names classes 72 which classify resources 58 and names properties 70 which classifies triples 56) are maintained in a system. The system listens for changes in the data 52 (or 54) by identifying the contents with previously stored contents. This is indicted by "contains" 80. The "contains" operation aggregates data changes relevant to one or more binds 60. For example, if a given bind is sensitive to a particular triple (56) a change in the data (52) of the triple will cause a trigger 63. Relevant data that triggers a bind can be identified by all those triples in the RDF subtree linked to by "contains" or descendant "contains" triples.

If an asynchronous resource update is observed that is relevant to a bind, the bind 60 executes to update/create 65 the resource 58 in accordance with the data (52) change. The type and kind of data that is changed is what triggers the bind or set of binds that execute.

The bind constructs 60 are executed in dependency order. This means that the first binds 60 executed are those without dependencies on the execution of other binds, followed by binds with dependencies when the dependencies are made available by execution of other binds.

In accordance with the updates from the bind component 60, a create construct 62 is triggered 67 and creates 69 a new resource, if needed. The new resource (58) may include the updates generated by executing binds 60. Likewise, a let construct 64 is triggered 71 to create new triples 56, if needed. The new triples (56) may include new associations between old or new data (52). The bind constructs 60, create constructs 62 and let constructs 64 may be included in a same unit 68 or component, which may be stored or maintained as a stand-alone component. The create and let constructs may be repeatedly executed based upon updated resources to create new resources and triples.

The runtime state of a program comprises a set of resources and triples included in a triple store. The present embodiment provides constructs (e.g., bind, create, let) that the programmer uses to declaratively specify updates to the runtime state.

A <bind> construct declaratively specifies how the value of a resource changes in response to changes in the values of other resources, using, e.g., XQuery as a functional value computation language. Although other languages may be employed, e.g. Javascript™. The <let> and <create> constructs declaratively specify the creation of new resources, relate new and existing resources by creating and destroying triples, and change the classification of new and existing resources, all based on current resource values.

Execution is driven by updates. An update is the assignment of a value to a resource. Each external event, such as a user input, is reflected as an initiating update. In response to an initiating update, a program performs an execution cycle, hence listening for changes. An execution cycle performs a cascade of ensuing updates, as declaratively directed by the <bind> constructs of the program. After performing the resource value updates directed by the <bind> constructs, the program creates new resources, resource relationships, and classifications, as declaratively directed by the <let> and <create> constructs.

During any given execution cycle, each resource that will be updated is updated exactly once by the execution of a <bind> construct, after all input resources to that bind have been updated. Thus, each resource has a well-defined old value, which is its value prior to the start of the execution cycle; and a new value, which is its value after the completion of the execution cycle.

When a <bind> construct executes, it has access to both the old and the new values of its input resources. Binds that use new values can be used to model constraint-like updates, for example, keeping a data or presentation view in sync with the data being viewed. Binds that use old values can be used to model non-idempotent operations such as adding to a total, appending an item to a list, or inserting a record into a database.

Path expressions play a central role in the language in accordance with the present principles, for example, to identify the specific resources whose values are declaratively related by a <bind> construct. A path expression is a formula for navigating from one resource to one or more other resources via RDF triples. Path expressions are based on XPath expressions, but in accordance with the present principles XPath is generalized to permit navigation over arbitrary RDF graphs by using the mapping between RDF and XML as described above.

Figure 3:
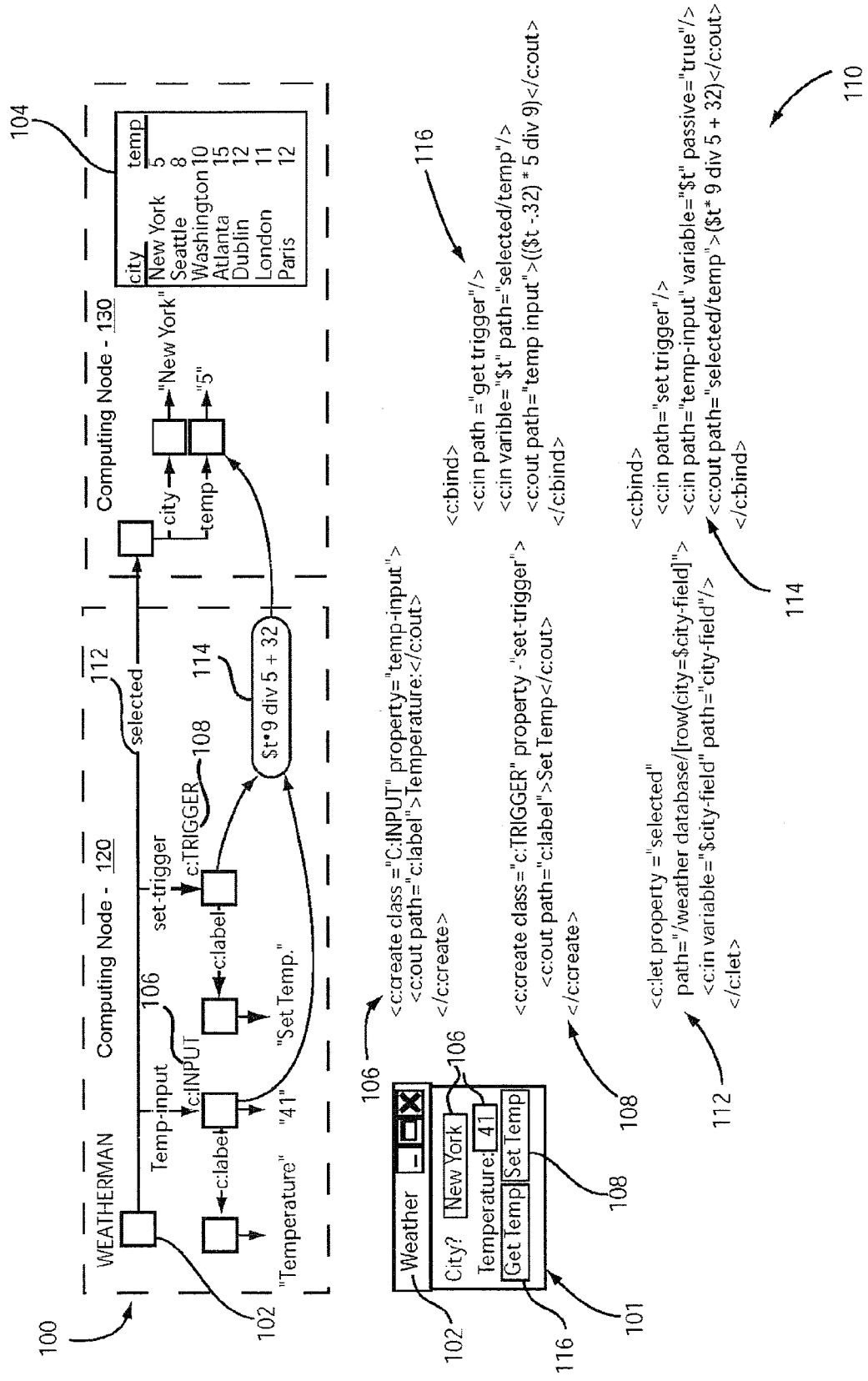
FIG. 3 is a diagram showing a form, graphs and corresponding code for an example for carrying out one illustrative embodiment.

Referring to FIG. 3, an illustrative end-to-end example shows a graph 100, an illustrative form 101 and corresponding programming code 110 to illustrate concepts in accordance with the present principles. The following example is a simple end-to-end application that provides a form 102 that permits querying and updating a relational database of weather information 104. The <create> construct associates user interface elements such as inputs 106 and triggers 108 with the WEATHERMAN resource class that represents the form. A <let> construct 112 uses the "city" input field to select a row from the database, recording it using the "selected" property. A <bind> construct 114, triggered by the "set" trigger 108, updates the database with the quantity in the "temperature" input field, after converting Fahrenheit to Celsius. A similar <bind> construct 116 retrieves the temperature from the database 104, converting Celsius to Fahrenheit.

As indicated by dashed boxes, the application may be distributed among multiple computing nodes 120 and 130, such as a browser and a server. Distributed data structures are formed by triples that connect resources with URLs residing on different computing nodes, such as 112. Distributed execution occurs when <bind> constructs that reference distributed data structures are executed, such as binds 114 and 116.

Efficient protocols to implement such distributed data and execution models are provided in accordance with present embodiments. For example, the execution of bind 114 can be accomplished, at a protocol level, by an appropriate HTTP PUT or POST operation.

Interaction model: The presentation and user interaction model provided in accordance with the present principles permits the description of user interfaces, or application "front-ends", at a range of levels of abstraction. A recursive Model View Controller (MVC) pattern is supported, permitting a developer to refine an abstract user interface description through successive levels of more concrete specification.

The model of an instance of the MVC pattern is represented by a resource. The view of MVC is a set of resources associated with the model, whose instantiation is declaratively driven by the <create> construct. The controller of MVC is a set of <bind> constructs that update the model resource in response to updates to the view resources, and vice versa. The set of resources that comprise a view of a model resource may themselves serve as models for other views, thus supporting a recursive MVC pattern (See FIG. 6). The set of resources comprising a view, together with the <bind>-based controller that connects the view resources with the model resource, may also be seen as a more concrete refinement of an abstraction represented by the model. Conversely, the model may be viewed as an encapsulation of the functionality provided by the view.

Relationship to Xforms: The present invention builds on and generalizes many of the concepts from XForms to produce a uniform programming model across all application tiers. The XML tree-based MVC design of XForms is made recursive and generalized to RDF graphs. The concept of view-model and model-model binding is expanded to a general-purpose computation model based on resource-resource binding. Data-driven user interface instantiation is generalized to declarative resource instantiation. The event-driven execution model of XForms is simplified and regularized by the data-centric update-driven execution model in accordance with the present principles.

Composition model: The declarative data and execution models in accordance with the present invention support a flexible approach to application composition. This is illustrated by some examples drawn from application front-ends. However, these programming model capabilities likewise support flexible composition in all tiers of the application.

Flexible decomposition and styling: The choice of a particular view to refine an abstract model resource is determined by the class of the model resource. The support for multiple and dynamic classification permits a great deal of flexibility in this process because the choice of specific presentation for an abstraction to be made early, by the developer of the abstraction; or later at composition time or run time by a consumer of the abstraction.

Referring to FIG. 4, for example, an interactive calendar abstraction may include a resource of class DATE whose programmatically computed value is a date to be presented to the user, and whose value is updated as a reflection of the act of choosing a date by the user. A more specific choice of presentation for a DATE model, for example, as three fields for year, month and day, may be made by classifying (either early or late) some or all DATE resources in an application with classification DATE3, and defining a set of view resources to be associated with the DATE model resource by virtue of its classification as a DATE3 resource.

Open composition and adaptation: The open approach taken by the present principles (and RDF) for definition of structure and function associated with classes supports flexible multi-organizational composition and adaptation of applications. For example, suppose that IBM partners with a book store to provide IBM employees with supplies such as books. The partnership agreement requires that IBM modify "stock" user interfaces and processes, such as adding provision to specify an IBM approver for each order. This might require that IBM insert an approver field in each submitted IBM order, and a corresponding input field into the ordering page.

Figure 5:
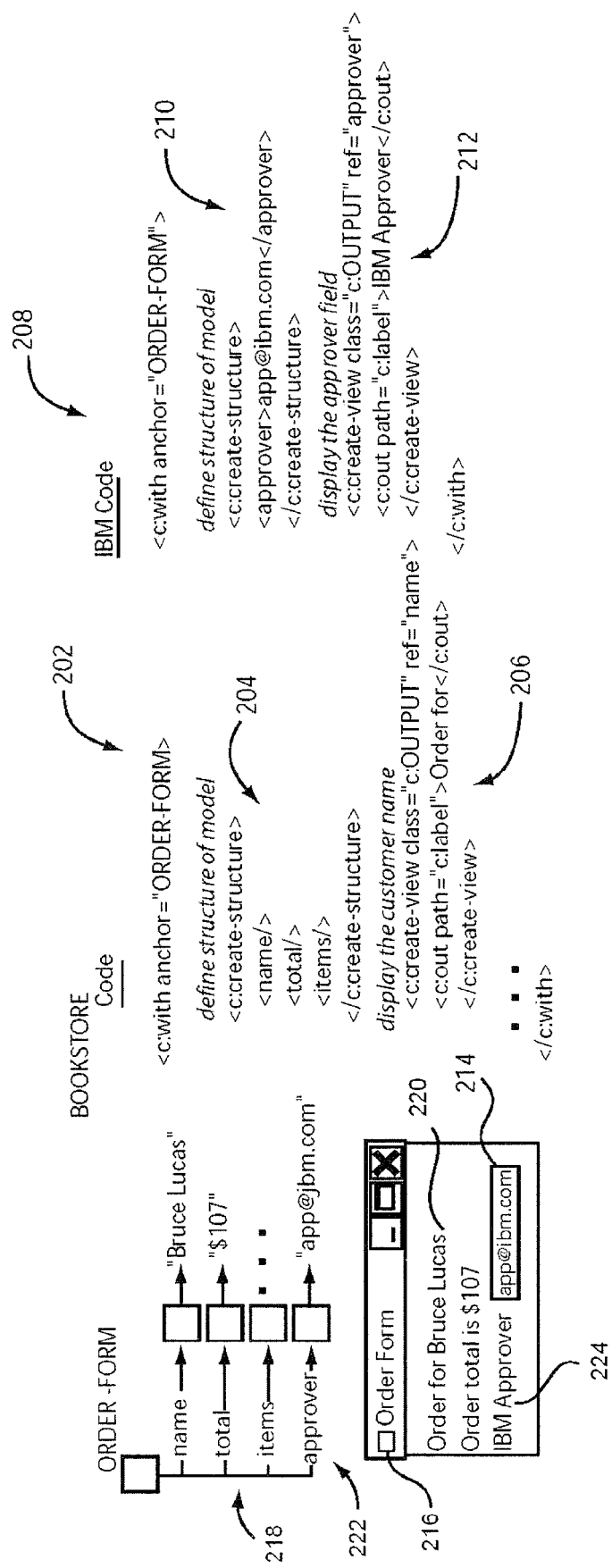
FIG. 5 is a diagram showing a form, graphs and corresponding code for an example for multi-organizational changes that can be made to resources in accordance with one illustrative embodiment.

Referring to FIG. 5, a fragment 202 of bookstore code for a customer order form 216 is illustratively shown. Bookstore code 202 includes code portions 204 of the definition of an order form model 218 and code portions 206 of the definition of the order form presentation 220. Also shown is a fragment 208 of code, including code portions 210 for an approver field and code portions 212 for a corresponding presentation item, separately specified by IBM to customize the bookstore order form 216, including the addition of an approver field 214 to the model 222 and of a corresponding presentation item 224.

Thus, while the <with> construct (202 and 208), which is an anchor construct, in accordance with the present embodiment is comparable in some respects to a class definition (of the ORDER-FORM class in the example above), it is more flexible in that it permits the complete definition of a class to be composed from multiple independently specified sources. This approach supports flexible multi-organization composition of applications.

Device Adaptation: At the most concrete end, the MVC interaction recursion is grounded in a set of built-in resource classes that may drive existing technologies such as Swing, XHTML, or VoiceXML to represent device-specific atoms of user-interaction, such as buttons, fields, and voice commands. Just above this most concrete level is a level of resource classes representing more abstract (but still primitive) units of interaction, such as input, outputs, and triggers. These primitive units of interaction are gathered together into collections of simultaneously enabled interaction, such as pages, which are sequenced in flows. Any of these levels of interaction may be connected to persistent data stores.

The present invention uses a uniform data and execution model for all levels of this recursive MVC tree, supporting flexible device adaptation by tapping into the models at any level of the tree. Thus, one approach to device adaptation could simply be to provide an alternative view to an existing model—as would likely be possible in any current MVC framework. We have the additional option of extending the model-view recursion uniformly by treating the old view as a model to a new view better suited to a mobile device. Note that it is a design decision as to whether driving the old view or providing a new one will provide a better user experience or be easier to implement. The present approach provides a spectrum of possibilities via a common set of language features.

Figure 6:
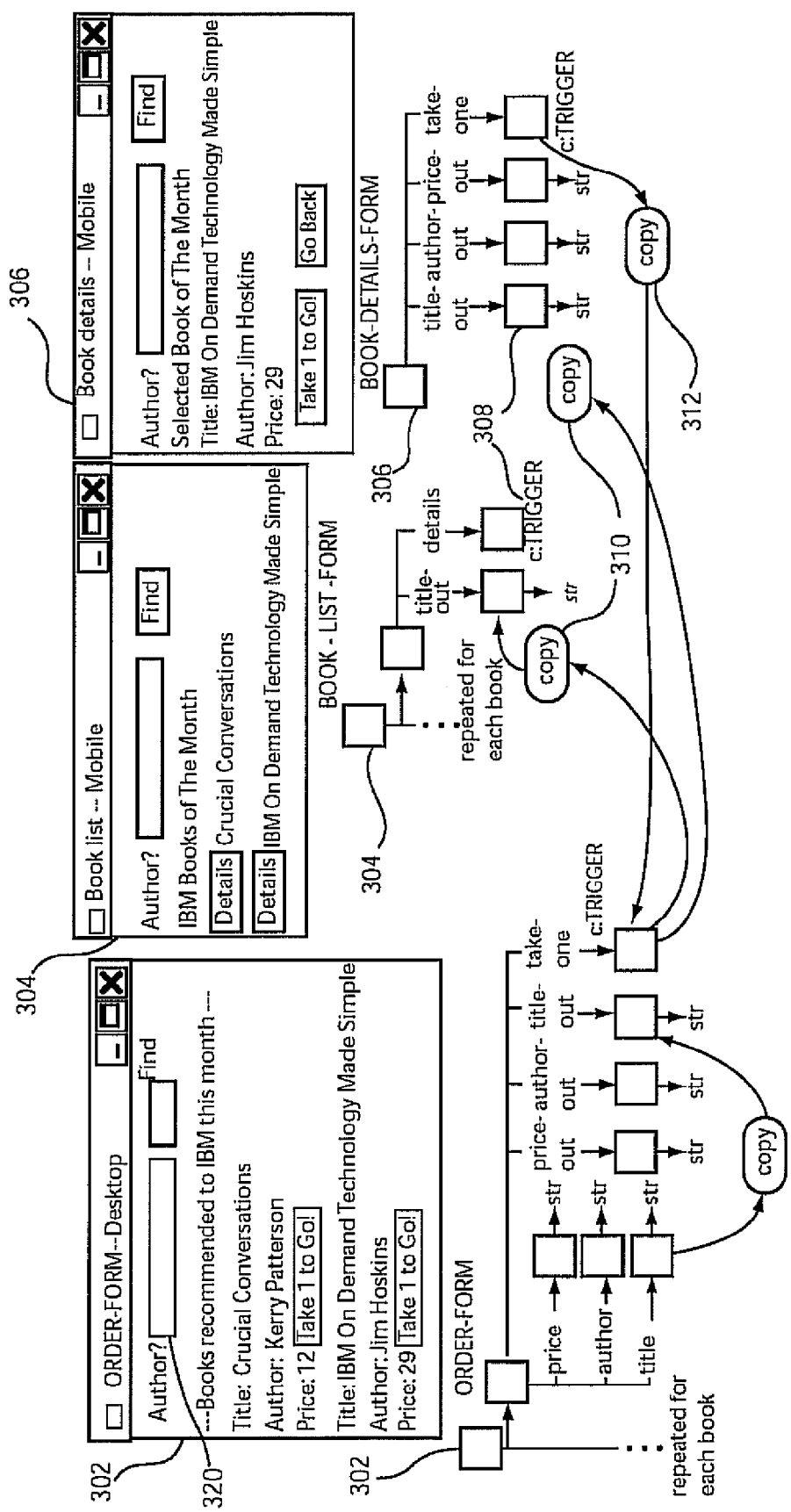
FIG. 6 is a diagram showing forms and graphs a simple page for searching for titles using different devices in accordance with a device adaptation embodiment.

Referring to FIG. 6, a simple page is shown for searching titles in the hypothetical bookstore application described above. View 302 is oriented toward a desktop device with sufficient display space to show an author search field, available categories, featured book of the month list, and details of a selected book all at the same time. Views 304 and 306 are oriented toward a mobile device. Views 304 and 306 bind to the view resources of the desktop view 302 as their model. View 304 displays a "master" list of books, while view 306 displays the details for a single selected book. The artifacts creater for this adaptation include new view element 308, "binds" 310 linking the new view to the old view and controlling navigation 312. Since these features 308, 310 and 312 are all present programming constructs in accordance with the present invention, these features remain available for still further adaptation if needed.

Figure 7:
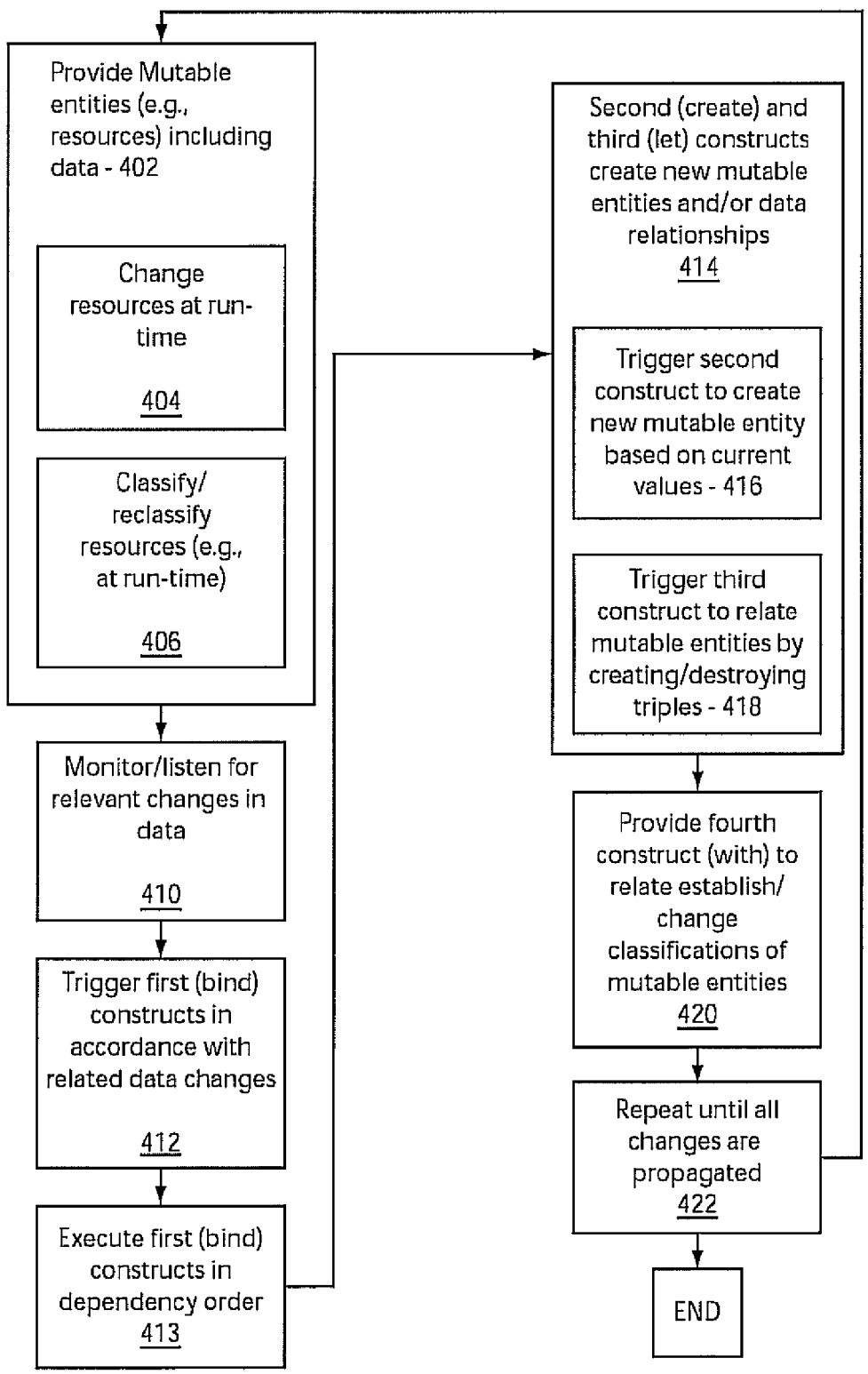
FIG. 7 is a block/flow diagram showing a system/method for managing resources in accordance with one illustrative embodiment.

Referring to FIG. 7, a system/method for managing resources in a programming environment supports enterprise, web and client applications. The system/method includes, in block 402, mutable entities are provided including related data. The related data preferable includes triples or other connected data. The data relevant to constructs may be determined based upon graph structure relationships. Mutable entities preferably include resources and more preferably RDF resources structures. The mutable entities or resources may include the capability to be programmatically changed at runtime in block 404. In block 406, the mutable entities or resources may be classified in more than one class wherein the classes of the resources may be programmatically changed at runtime.

In block 410, changes are monitored or listened for in the related data. In block 412, when a relevant change to the data is determined, a first construct, e.g., a bind construct, is triggered in accordance with the changes in the related data to update the resource or mutable entity. This includes specifying how a value of a mutable entity changes in response to the changes in the related data. The first constructs are executed in dependency order in block 413. The first construct has access to old and new values for the related data to determine the mutable entity changes. Changes in the related data may be declared active to indicate a trigger of the first construct.

In block 414, in accordance with the updated mutable entities, a second construct and a third construct may be triggered to respectively create a new mutable entity or update a data relationship in block 416, the second construct (create) is triggered to create a new mutable entity based on current entity values. In block 418, the third construct (let) relates new and existing mutable entities by creating and destroying triples based on current entity values. The third construct connects data in triples such that same data may be employed in a plurality of ways to eliminate multiple redundant abstractions.

In block 420, a fourth construct (with) is provided and is employed to change a classification of a mutable entity based on current entity values. In block 422, the process may be repeated until all changes have been propagated in all constructs. Changes made in each construct may affect resources which may propagate through other resources. It should be noted that the constructs may be employed together or independently as needed.

Figure 8:
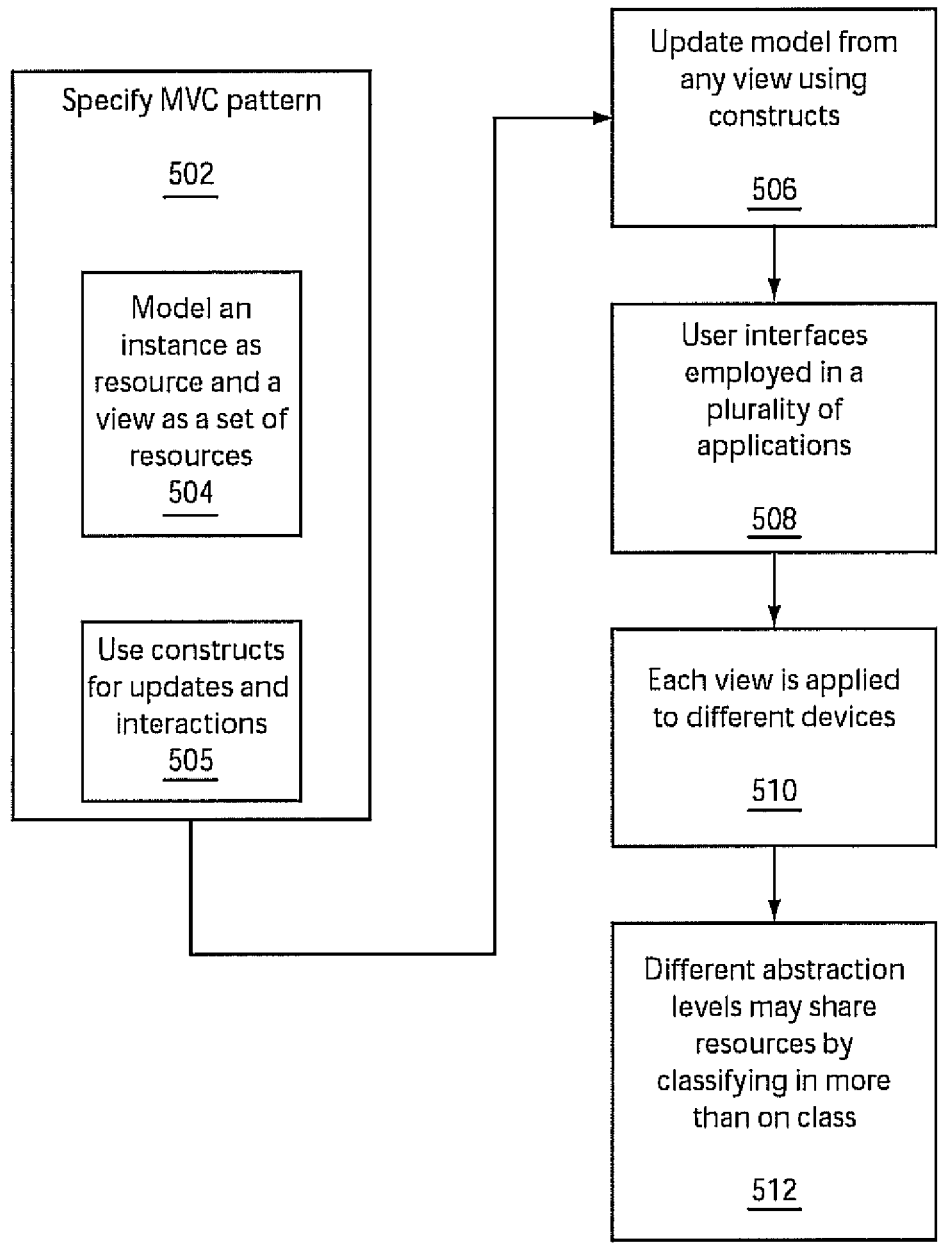
FIG. 8 is a block/flow diagram showing a system/method for managing resources for device adaptation in accordance with another illustrative embodiment.

Referring to FIG. 8, a system/method for managing resources is illustratively depicted. The system/method provides an interaction model to permit the description of user interfaces, or application "front-ends" (and back-ends), at a range of levels of abstraction. A recursive Model View Controller (MVC) pattern is specified in block 502, permitting a developer to refine an abstract user interface description through successive levels of more concrete specification. A plurality of user interfaces, business objects or data objects, etc. are specified at a plurality of abstraction levels using resource classes.

In block 504, a model of an instance of the MVC pattern is represented by a resource. A view of MVC is a set of resources associated with the model, whose instantiation is declaratively driven by the <create> construct. The controller of MVC is a set of <bind> constructs that update the model resource in response to updates to the view resources, and vice versa. In block 505, the construct interactions and resource updates may be provided as described above (See e.g., FIGS. 2 and 7). The set of resources that comprise a view of a model resource may themselves serve as models for other views, thus supporting a recursive MVC pattern (See FIG. 6). The set of resources comprising a view, together with the <bind>-based controller that connects the view resources with the model resource, may also be seen as a more concrete refinement of an abstraction represented by the model. Conversely, the model may be viewed as an encapsulation of the functionality provided by the view.

In block 506, the model is updated in response to updates in any view by providing a plurality of constructs to implement the updates. In block 508, the user interfaces are applicable to a plurality of applications. In block 510, each view may be applied to a different device. For example, computer desktops, mobile telephones, personal digital assistants or any other devices. A first view may be applied to a desktop device and a second view to a mobile device. Alternately, a first view may be applied to a first application and a second view may be applied to a second application in the same or different devices. In block 512, the different abstraction levels may share resources by classifying resources in more than one class, and the classes of the resources may be programmatically changed at runtime.

Figure 9A:
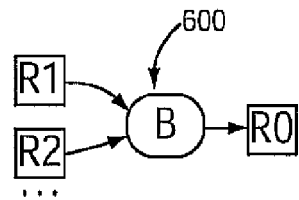
FIGS. 9A and 9B are diagrams showing a bind construct in accordance with one aspect of the present invention.
Figure 9B:
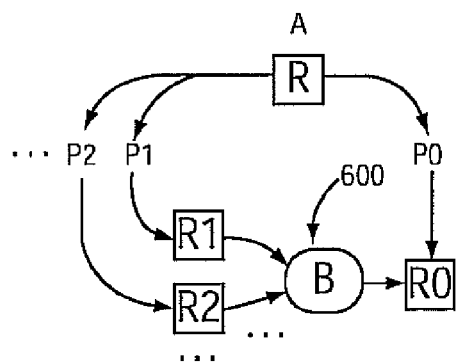

Referring to FIGS. 9A and 9B, a bind construct 600 is illustratively shown. Bind construct 600 is a declarative expression of a functional relationship (R0) between resource values (R1 and R2). Effectively, the bind construct 600 is a one-way conditional constraint on the resource values. The bind construct 600 may be triggered by an update to an input source (R). A developer specifies a function to compute output R0 from R1, R2, etc. Each input may be active or passive. An active input is an update that triggers execution of the bind construct 600. A passive input does not trigger execution of the bind construct 600. Each input may refer to its resource's new value (value at the end of the execution cycle) or old value (value at the beginning of the execution cycle). For example, the new value could be used for constraint-like computations, while the old value may be used for non-idempotent operations such as inserting a value into a set or adding to a value.

Referring to FIG. 9B, bind construct 600 is depicted with more details. For every resource R of class A, create a binding B with input resources R1, R2, etc. reachable via paths P1, P2, etc., respectively. Output resource R0 is reachable by path P0. The bind B is computable by a given expression, e.g., in XQuery. Illustrative XML code includes the following:

```
<bind anchor="A"
<in path="P1" variable="$V1"/>
<in path="P2" variable="$V2"/>
...
<out path="P0">
xquery expression involving $V1, $V2, ...
</out>
<bind>.
```

Figure 10:
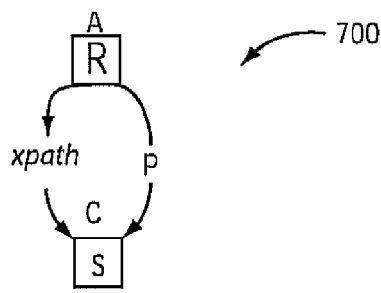
FIG. 10 is a diagram showing a let construct in accordance with one aspect of the present invention.

Referring to FIG. 10, a let construct 700 is illustratively depicted. Let construct 700 is a declarative data-driven construct for the creation of structure. The let construct 700 provides for the creations of triples to connect resources and the classification of resources, e.g., using properties and classes. For example, for every resource R of class A, and for every resource S reachable by xpath from A, classify S with class C and connect R to S with property p. Illustrative XML code includes the following:

```
<let
    anchor="A"
    path="xpath"
    property="p"
    class="C"/>
```

Figure 11:
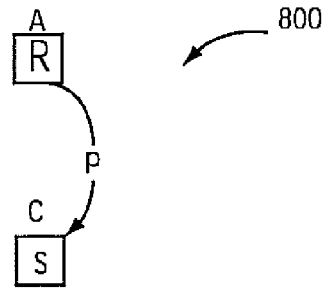
FIG. 11 is a diagram showing a create construct in accordance with one aspect of the present invention.

Referring to FIG. 11, a create construct 800 is illustratively depicted. Create construct 800 is a declarative data-driven construct for the creation of structure. The create construct 800 provides for the creation and classification of resources, e.g., using properties and classes. For example, for every resource R of class A, create a resource S and classify S with class C. Connect R to S with property p. Illustrative XML code includes the following:

```
<create
    anchor="A"
    property="p"
    class="C"/>
```

Execution Models in accordance with the present principles are for building reactive systems. Thus, the execution model defines how the runtime state of a program changes in reaction to the occurrence of external events such as user inputs or messages from external systems; or in reaction to the occurrence of asynchronous internal events. The execution model is data centric, meaning that all aspects of the execution model are described in terms of changes of the runtime state of the program. The runtime state of a program comprises a set of RDF triples included in a triple store. Execution is driven by updates.

An update is the assignment of a value to a resource (even if that value is the same as the value that the resource has before the update). An update may be either an initiating update or an ensuing update. Each external event, such as a user input, is reflected as an initiating update. In response to an initiating update, a program performs an execution cycle. An execution cycle performs a cascade of ensuing updates, as declaratively directed by the program constructs. In effect, the initiating updates may be viewed as "clock ticks" that define a succession of values for the resources in the cascade of the initiating update. The language in accordance with the present principles provides constructs that the programmer uses to specify updates to the runtime state.

Following the dichotomy in the data model between value and non-value triples, the execution model provides two classes of constructs for updating program state: 1) The <c:bind> construct declaratively specifies how the value of a resource changes in response to changes in the values of other resources, using XQuery as a functional value computation language; and 2) The <c:let> and <c:create> constructs declaratively specify the creation of new resources, relate new and existing resources by creating and destroying non-value triples, and change the classification of new and existing resources, all based on current resource values.

Referring again to FIG. 2, data model concepts (ellipses), execution model concepts (rectangles), and the relationships between them are depicted. During any given execution cycle a set of binds will be triggered by the update of an input resource. A bind that is triggered is called a relevant bind. Each resource that will be updated is updated exactly once by the execution of a <c:bind> construct 60, after all input resources to that bind have been updated. Thus, each resource has a well-defined old value, which is its value prior to the start of the execution cycle; and a new value, which is its value after the completion of the execution cycle. When a <c:bind> construct executes, it has access to both the old and the new values of its input resources. Binds that use new values can be used to model constraint-like updates (65), for example keeping a data or presentation view in sync with the data being viewed. Binds that use old values can be used to model non-idempotent operations such as adding to a total, appending an item to a list, or inserting a record into a database.

After performing the resource value updates directed by the <c:bind> constructs (by creating and destroying value triples associated with a resource), the present programs create new resources, resource relationships (represented as non-value triples), and classifications (also represented as non-value triples), based on the new resource values. These actions are declaratively directed by <c:let> 64 and <c:create> 62 constructs.

The present programming model constructs are declarative, meaning that they may be viewed as conditional constraints on the runtime state. These constraints may be constraints either on the new state of the system after the completion of an execution cycle, or constraints relating the new state of the system after the completion of an execution cycle to the old state of the system prior to the initiating update. At the completion of an execution cycle, the state of the system will satisfy the constraints specified by all <c:let> and <c:create> constructs, and the constraints specified by the relevant binds, which are the binds whose execution was triggered on that execution cycle.

Within the scope of its cascade, the initiating update appears to be spontaneous and independent of updates in other cascades. There are many independent sources of initiating updates (people, internal, external systems). Therefore, the cascade executions triggered by such spontaneous, independent initiating updates could potentially interfere with each other. This is prevented by requiring that each cascade run to completion, and appear to be executed all at once, relative to other cascades. Because the executions of different cascades do not interleave, they are said to be isolated. Note that all that is needed is that the cascades run as if they were isolated; insofar as the cascades do not in fact interfere by reading and updating shared resources, the system may execute the cascades concurrently.

XPath and XQuery build on the XPath and XQuery languages, respectively. The relationship between the present invention and XPath/XQuery can be described in two ways: 1) The present bind, let, and create constructs provide a "wiring" language that declaratively describes how the state of a system is updated in response to external events that are manifested as resource value updates. The present language delegates the functions of traversing a graph of resources to the XPath language, and delegates the function of computing value trees from other value trees to the XQuery language. 2) XPath and XQuery provide a means for traversing graphs and computing values over trees, but do not in themselves explain how system state is updated. The present invention extends those languages to incorporate the capability of describing system state evolution.

Role of XPath: Path expressions play a central role in the present language, for example to identify the specific resources whose values are declaratively related by a <c:bind> construct. A path expression is a formula for navigating from one resource to one or more other resources via RDF triples. Path expressions in accordance with the present principles may be based on XPath expressions. XPath per se is designed to operate over tree data structures, but the present invention generalizes XPath to allow navigation over arbitrary RDF graphs by using the mapping between RDF and XML. Alternatively, it could be said that Collage uses an XPath-like language to navigate RDF graphs.

The mapping between RDF and XML maps XML elements to RDF properties. Correspondingly, Collage path expressions use XPath element node test syntax to navigate from one RDF node to another via RDF triples, with the RDF triple property name used in place of the XML element name in the XPath syntax.

Figure 12:
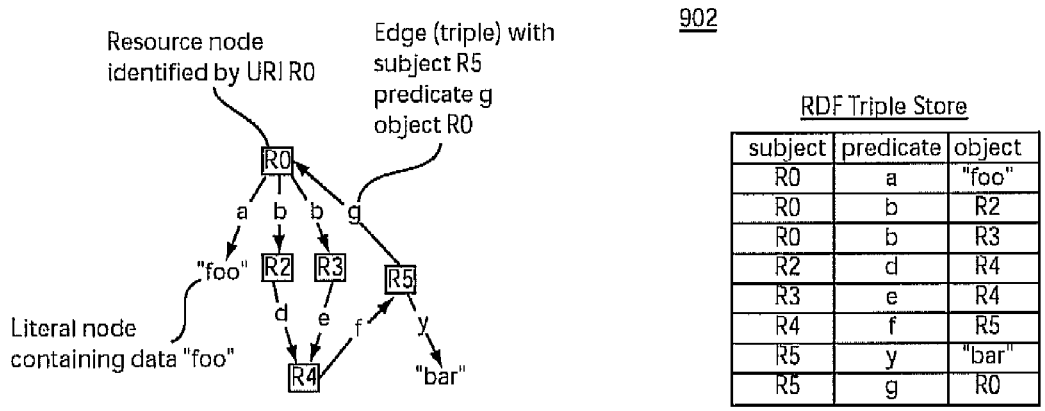
FIG. 12 is a diagram showing an RDF graph and triple store used to traverse triples in accordance with the present principles.

Referring to FIG. 12, consider an RDF graph 902. A path expression b/e/f, starting with resource R0, gives a result node set {R5}. Here b, e, and f specify triple predicates that are used to traverse triples from their subject resource to their object resource. Path expressions also allow navigation "in reverse", that is, from triple object to triple subject. This is analogous to the parent axis in XPath expressions. However, because XPath expressions operate over trees, there is always a unique parent, accessed using the parent axis abbreviation in XPath. In paths in accordance with the present language, there may be more than one triple whose object is a given resource, so a more general notation is needed: to traverse a triple with predicate p "in reverse" (from object to subject), a path expression may specify a step of p . . . . For example, a path expression of b/e/d . . . navigates from resource R0 to resource R2 in the preceding example.

Every service in accordance with the present principles has a single root node (R0), which is used for example to provide access to service-wide "global" resources, such as service-level singleton data structures, which often are used to model the application concept of service-level global databases. Present path expressions access the root node using the XPath/document root syntax. For consistency with the semantics of the XPath element axis, which is tree structured, present path expressions always return lists of unique nodes. This means that in cases where a path expression traverses a graph to arrive a node through multiple paths, the present path expression returns one node for each path. In effect, the graph is dynamically expanded to a potentially infinite tree (in the case of graphs with cycles) to allow the use of the XPath element axis to traverse a graph. There are other approaches to using XPath to traverse graphs. In one possible approach the XPath data model can be used to represent graphs directly, giving up the convenience of the element axis notation to traverse the graph (for example, using graph traversal functions).

Role of XQuery: The present bind construct provides a means for computing a resource value from one or more other resource values. The bind construct builds on the XQuery language for specifying such computations. XQuery is designed to operate on XML trees, while the present invention uses RDF graphs, so a mapping between RDF and XML is needed to allow the use of XQuery to perform computations on RDF graphs. Because resource values are always tree structured, the mapping between RDF resource values and XML is straightforward. The following simple example illustrates the use of XQuery in the present language (which may be referred to as the Collage language or simply Collage).

```
<c:create class="c:TOP">
    <c:bind
        init="true">
        <c:out>
            <name>Kris Kringle</name>      <!-- (1) -->
            <ssn>123456789</ssn>            <!-- (1) -->
            <salary>1234</salary>          <!-- (1) -->
```

```
        </c:out>
    </c:bind>
    <c:create class="c:TRIGGER" property="trigger"/>
    <c:create class="c: INPUT" property="salary-input"/>
    <c:bind>
        <c:in path="trigger"/>
        <c:in path="." variable="$employee" passive="true"
                                            version="old"/>
        <c:in path="salary-input" variable="$salary-
        input"
                                            passive="true"/>
        <c:out path=".">
            {$employee/* except $employee/salary}    <!-- (2) -->
            <salary>{$salary-input/text( )}</salary><!-- (2) -->
        </c:out>
    </c:bind>
</c:create>
```

Figure 13:
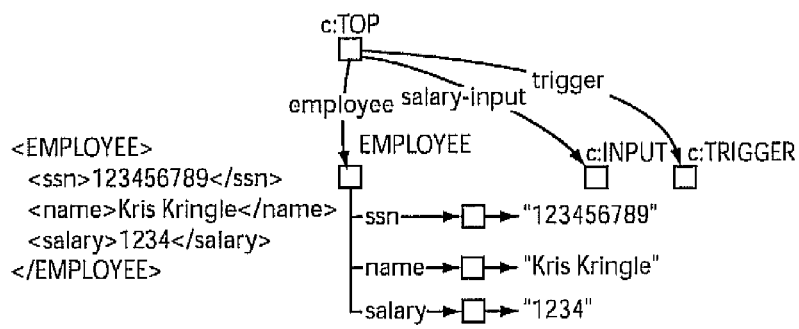
FIG. 13 is a diagram showing an RDF graph for an XML representing a resource converted to triples.
Figure 14:
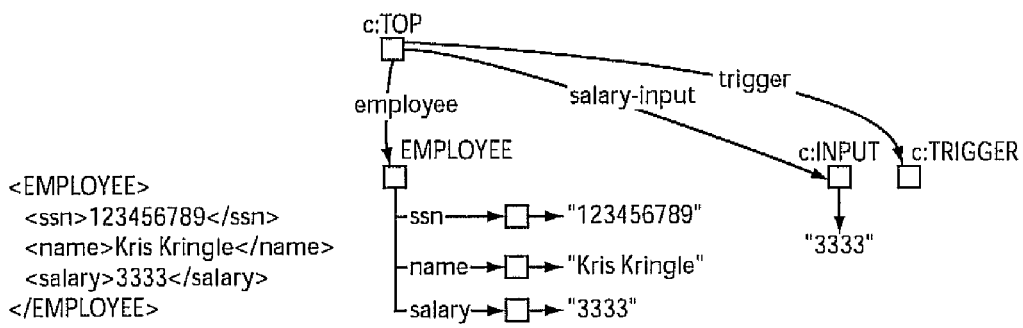
FIG. 14 is a diagram showing an RDF graph for an XML representing a resource converted to triples with a new value output.

The XQuery expression marked (1) above computes an initial value for the EMPLOYEE resource created by the enclosing create construct. The initial value is computed as an XML fragment representing the value of the resource, and that XML fragment is then converted to RDF triples as described above. The net result is the RDF graph shown in FIG. 13. The XQuery expression marked (2) in the above example updates the value of a form model resource. It receives the current value of the form model resource, expressed as an XML fragment, in the variable $ employee; and the new salary as an XML fragment in the variable $ salary-input. The XQuery expression (2) copies all of the elements of the XML fragment except for the salary element, substituting a new salary element that contains the new salary, and returning the resulting XML fragment. The resulting XML fragment provides the new value for the form model resource as shown in FIG. 14.

Declarative semantics: The executable constructs of the Collage language: the bind, create and let constructs will have their semantics described declaratively. It is a goal of declarative languages that the semantics of a composition of two or more language constructs are related to the semantics of the individual constructs in a manner that is simple both for humans to understand and computers to analyze. In Collage, this goal is facilitated by the following general semantic framework. Collage is a language for building reactive systems. The Collage semantics is described with respect to the reaction of the system to a series of asynchronous events that in effect define a series of virtual, irregular "clock ticks". Events may originate from a user, from an external non-Collage system, or from an internal asynchrony mechanism, and uniformly manifest themselves in Collage as initiating updates. The Collage executable constructs define how the state of the system changes in reaction to those initiating updates. Thus an observed sequence of initiating updates induces in the system a sequence $S_1, S_2, \ldots$ of system states. The system state comprises the totality of triples stored in the system.

The set of Collage executable constructs that execute in reaction to any given initiating update is called an execution cycle. During any given execution cycle a set of constructs, called the relevant constructs, is chosen to execute based on a straightforward set of rules. The execution of the relevant constructs on any given execution cycle determines the transformation from the old state $S_i$ before the commencement of execution cycle to the new state $S_{i+1}$, after the completion of the execution cycle. The semantics of the system can be described as a set of constraints that are in effect on any given execution cycle, each constraint deriving from a relevant construct, that constrain the new state of the system $S_{i+1}$, and also constrain the relationship between the old state of the system $S_i$ and the new state of the system $S_{i+1}$.

To produce a language that is both straightforward to understand and tractable to implement, Collage semantics provide that execution cycles proceed without iteratively searching for solutions to the constraints. This means that once a resource value has been updated by a bind construct, it will not be updated again on the same execution cycle. In addition to helping to guarantee termination of each execution cycle, this condition gives a well-defined meaning to the old value of a resource (the value of the resource in the old state of the system $S_i$) and the new value of a resource (the value of the resource in the new state of the system $S_{i+1}$). The old and new values of a resource are made available to a bind, thus allowing the bind to function as a constraint on the new state of the system and on the relationship between the old and new states of the system. Once a triple has been added by a create, let, or bind construct, it may not be removed in the same execution cycle, and once a triple has been removed, it may not be added in the same execution cycle. This condition helps guarantee termination of each execution cycle.

Execution cycles triggered by spontaneous, independent initiating data updates may occur concurrently. Concurrency is accommodated in Collage by providing that each execution cycle run to completion, and appear to be executed all at once, relative to other execution cycles. Because the different execution cycles do not interleave, they are said to be isolated.

Bind construct: The Collage language bind construct specifies how output resources are updated with values that depend on the values of input resources, in response to updates to its input resources. Each bind construct in a Collage program is a declaration of such a relationship between the values of classes of input and output resources. A bind instance, generated by a bind construct, relates a particular output resource to particular input resources, as follows with reference to FIG. 9B: A bind construct 600 specifies:

A class A called the anchor class of the bind construct. The anchor class controls generation of bind instances for the bind construct. There is one bind instance B generated by the bind construct for each resource R of class A. Each resource R of class A is called the anchor resource for its corresponding bind instance B.

A set of path expressions P0, P1, P2, . . . , one for each input to and output from the bind. Each path expression Pi specifies a navigation path from the anchor resource R to an input or output resource Ri for each bind instance.

An indication for each input whether that input is active or passive, which controls whether updates to the resource on that input trigger the execution of a bind instance.

An indication for each input whether that input uses the old value or the new value of resource on that input.

An XQuery expression that computes an updated value for the bind instances output resource, given the values of the corresponding resources.

Execution of a bind instance may be triggered by updates to its inputs. An initiating update triggers one or more bind instances, and execution of those bind instances causes ensuing updates that trigger more bind instances, and so on. Thus, binds are said to be cascaded. The set of bind instances that execute as the result of an initiating update, together with the resources that are updated, form a cascade. The resource that is updated by the initiating update is called the initiating resource for the cascade. The programmer may designate each input to a bind as either active or passive. "Active" means that updates to that input resource trigger the execution of the bind. "Passive" means that while the bind uses the value of the input resource, updates to that input resource do not trigger the bind. Thus, a cascade includes all bind instances and resources that can be reached from the initiating resource for the cascade, through a chain of bind instances and resources that passes through only active bind inputs.

Because bind instances execute once and only once during an execution cycle, it is meaningful to refer to the old value (before the execution cycle) and new value (after the execution cycle) of a given resource. Each bind that is executed access to both the old and new values of its input resources. Thus, binds may be used both to update a resource to keep it consistent with the new value(s) of its input resource(s), and to perform updates, such as adding a number to the value of a resource, that compute a new value for a resource from the old values of that and other resources. The semantics of a bind can be described as follows: for every resource R of class A create a bind instance B with input resources R1, R2, . . . reachable via paths P1, P2, . . . from A output resource R0 reachable via path P0 from A computing the value of R0 from the values of R1, R2, . . . using the specified XQuery expression.

Each bind instance can be viewed as a conditional constraint relating the old and/or new values of its input resources to the new value of its output resource. A bind may refer to both the old and the new values of its input resources. Binds that use new values can be used to model constraints on the new state of the system, for example, keeping a data or presentation view in sync with the data being viewed. Binds that use old values specify constraints between old values and new values, that is, constraints on the state evolution of the system. Such constraints can be used to model non-idempotent operations such as adding to a total, appending an item to a list, or inserting a record into a database.

Create and Let constructs: While the bind construct is concerned with managing the values of resources (that is, creating and updating the tree of value triples associated with a resource), the create and let constructs are concerned with declaratively creating resources, and with creating and updating the non-value triples that connect resources in a graph. Each create construct in a Collage program is a declaration that drives the class-based creation of dependent structure, that is, resources whose existence depends on the existence of another resource.

A create construct 800 as shown in FIG. 11 specifies:

A class A called the anchor class of the create construct. The create construct specifies the creation of another resource S for every anchor resource R of class A that is created.

A class C that specifies the class of each resources S that the create construct creates.

A property p that is the predicate of a triple [R p S] that connects the anchor resource R and the created resource S.

Each let construct in a Collage program is a declaration that drives the creation and destruction of triples based on resource classification and/or on solutions to an XPath-based query.

A let construct 700 as shown in FIG. 10 specifies:

A class A called the anchor class of the let construct. The let construct specifies the creation of triples whose subject is an anchor resource R of class A.

An XPath expression that is used to navigate from a context node of an anchor resource R of class A to a set of controlled nodes $S_i$.

A property p that is the predicate of triples created by the let construct. For every anchor resource R of class A, a let construct creates triples of the form [R p $S_i$], where $S_i$ is a controlled node obtained by navigating from the anchor resource R via the let construct's path expression.

A class C that is a classification applied by the let construct to its controlled resources. For every anchor resource R of class A, a let construct creates triples of the form $[S_i$ rdf:type C], where $S_i$ is a controlled node obtained by navigating from the anchor resource R via the let construct's path expression.

Operational semantics: An operational view of the Collage language semantics serves two purposes: it allows a programmer to understand a program in operational terms like "when W happens, then X and Y and Z will happen"; and it provides a basis for describing an algorithm by which the declarative constraint-like semantics of a Collage program may be implemented. The operational semantics describe the sequence of system state changes, called an execution cycle, that occur as a result of an initiating update. The operational execution model only partially specifies the order in which state changes are performed. In many cases state changes may be performed in any order without changing the overall outcome, which creates opportunities for parallel execution. This does not create indeterminacy, because it occurs only in cases where the execution order makes no difference the final result at the end of the execution cycle.

Corresponding to the division of the data model into value and non-value triples, and the division of the execution constructs into value-processing binds and non-value processing lets and creates, the execution cycle proceeds in two phases: the let/create phase, related to processing non-value triples, and the bind phase, related to processing value triples. The overall execution cycle proceeds in the following steps: 1) The execution cycle begins by adding and deleting triples to bring the system state into agreement with the new resource value(s) prescribed by the initiating update. 2) Then, in the bind phase, the bind program constructs are executed so as to satisfy their implied constraints with respect to the old system state and with respect to the new system state that has been computed so far. 3) Then, in the let/create phase (described in more detail below), the let and create program constructs are executed so as to satisfy their implied constraints with respect to the new system state that has been computed so far. 4) Steps 2 and 3 are iterated alternately until no further changes to the new state of the system are made. During this iterative process, certain restrictions are observed as described previously: no resource is updated more than once, no triple that has been added is subsequently removed (and vice versa). That is, no search for a solution to the constraints is made, and the execution cycle proceeds directly to a guaranteed termination. Any program which would violate those restrictions is considered in error.

Figure 15:
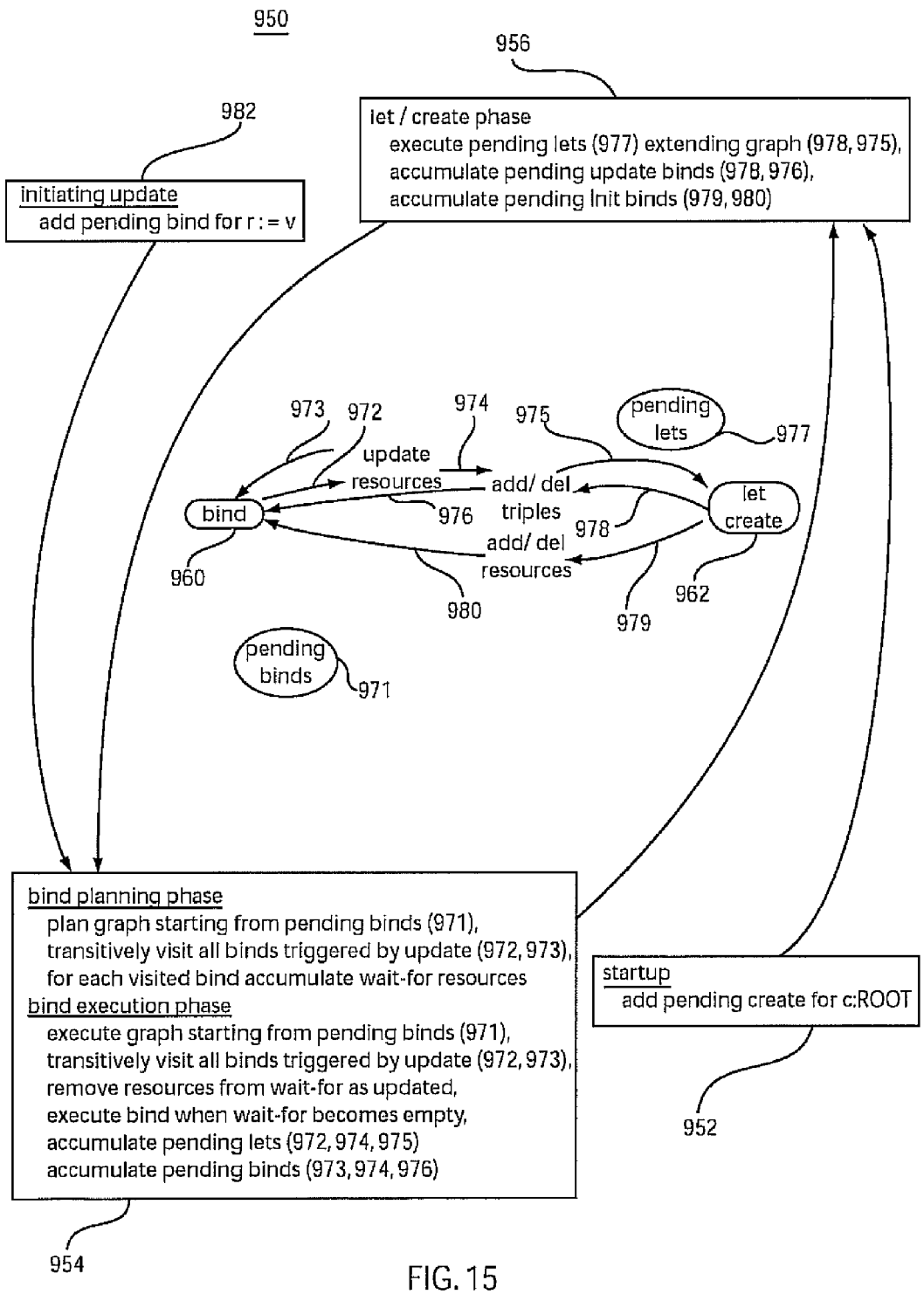
FIG. 15 is a block/flow diagram showing an execution model in accordance with one illustrative embodiment.

Referring to FIG. 15, an execution model 950 is illustratively shown. An execution cycle begins with an initiating update, followed by alternate bind and let/create phases until termination. FIG. 15 also shows an alternative starting point, used at service startup, that begins with the creation of a C:ROOT resource in block 952. In a bind phase of block 954, bind constructs are executed so as to bring the state of the system into agreement with the constraints on resource values that are implied by bind constructs. Each bind construct 960 generates one bind instance for each resource of the bind's anchor class, called the anchor resource for the bind instance. Each bind instance 960 has a set of input resources 980 and 9731 which are resources reachable from the bind instance's anchor resource via the input path expressions of the bind. Each bind instance 960 also has an output resource 972, which is the single resource reachable from the bind instance's anchor resource via the bind's output path expression.

The bind phase 954 begins with a planning phase that identifies all of the bind instances (pending binds 971) based on current resource classifications, and identifies each bind instance's input and output resources. The graph of resources and bind instances reachable from any resource that has been updated so far in this execution cycle (including initiating updates) by traversing bind instances from inputs to outputs is formed. The bind instances in this reachable graph are called relevant bind instances. In this phase, the set of input resources for each bind instance that will be updated by some relevant bind are also identified; these are called relevant resources. The graph starts from pending binds 971 and transitively lists all binds triggered by an update(s) 972, 973 and for each visited bind wait-for resources are accumulated.

The bind phase 954 then proceeds with an execution phase by identifying bind instances that have not already been executed (beginning with pending binds 971), and all of whose relevant input resources have been updated; these are called eligible bind instances. Each eligible bind instance is executed, updating its output resource 972. The resource update that occurs as the result of executing an eligible bind instance may make other binds eligible for execution. The execution of eligible bind instances proceeds until no there are no more eligible bind instances. Resources are removed from the wait-for as they are updated and the bind is executed when the wait-for becomes empty (972, 973). This description does not specify the order in which eligible bind instances are executed, because they may be executed in any order and still achieve the same result.

During the execution of the bind phase, certain consistency conditions are enforced to guarantee that at termination the constraint-like semantics of <c:bind> will be honored.

It is an error if the bind phase terminates with relevant binds that have never become eligible for execution. This indicates an unresolvable dependency loop in the program. It is an error if more than one bind instance updates a resource value, and the values supplied by the different bind instances do not all agree. It is an error if a bind instance that was executed is subsequently removed, for example because its anchor resource no longer has the appropriate anchor class.

During the execution of the bind phase the addition and deletion of triples may require that additional let, create, and bind constructs be executed in a subsequent let/create phase in block 956 or bind phase 954.

In the let/create phase 956, let and create constructs 962 are executed so as to bring the state of the system into agreement with the constraints on non-value triples and classifications that are implied by let and create constructs 962. Each create construct specifies a set of triples each of whose existence is dependent the classification of a particular resource with the anchor class of the create construct. Similarly, each let construct specifies a set of triples each of whose existence is dependent the classification of a particular resource with the anchor class of the let construct, and on the set of resources reachable via the let construct's path expression from the anchor resource.

During the execution of previous phases, changes to resource classifications, as well as additions and deletions of triples, may have changed the prerequisites for the existence of triples that are under the control of any given let or create construct. These pending lets 977 and pending binds 971 may be accumulated during the bind execution phase in block 954 (see paths 972, 974 and 975; and 972, 974 and 976, respectively). During the create/let phase 956, each let and create construct 962 whose prerequisites have changed is processed, resulting in the addition and deletion of further triples. Such additions and deletions of triples by the let/create constructs may require that additional let, create, and bind constructs be executed in a subsequent let/create phase or bind phase. In the let/create phase 956, pending lets 977 are executed extending the graph using input 975 and output 978 of triples. Pending update binds are accumulated through path 978/976 and pending initial binds are accumulated through path 979/980.

A program is in error if it requires the deletion of a triple that was added earlier in the execution cycle, or the addition of a triple that was deleted earlier in the execution cycle.

Concurrency: Execution cycles in Collage are triggered when an initiating update occurs, e.g., in block 982, as a result of user input, interaction with an external system, or the internal asynchrony generation mechanism. In effect, the initiating data updates may be viewed as virtual, irregular "clock ticks" that define a succession of values for the resources in the execution cycle of the initiating data update. Within the scope of its execution cycle, the initiating update appears to be spontaneous and independent of updates in other execution cycles. There are many independent sources of initiating updates (people, internal, external systems). Therefore, the execution cycle executions triggered by such spontaneous, independent initiating data updates may occur concurrently. Concurrency is accommodated in Collage by providing that each execution cycle run to completion, and appear to be executed all at once, relative to other execution cycles. Because the executions of different execution cycles do not interleave, they are said to be isolated.

The order in which different execution cycles execute may or may not be specified in a particular application; therefore the result of system execution may in this respect be indeterminate. A Collage implementation might concurrently execute different execution cycles if the resources they use are disjoint or if the implementation can determine that the execution cycles will not affect each other, but this is merely an optimization that does not affect the results of execution.

End-to-end example: The following example is a simple end-to-end Collage application that provides a form that allows querying and updating a relational database of weather information. The example, illustrates how a single declarative data and execution model is used uniformly through all tiers of a distributed application.

Figure 16:
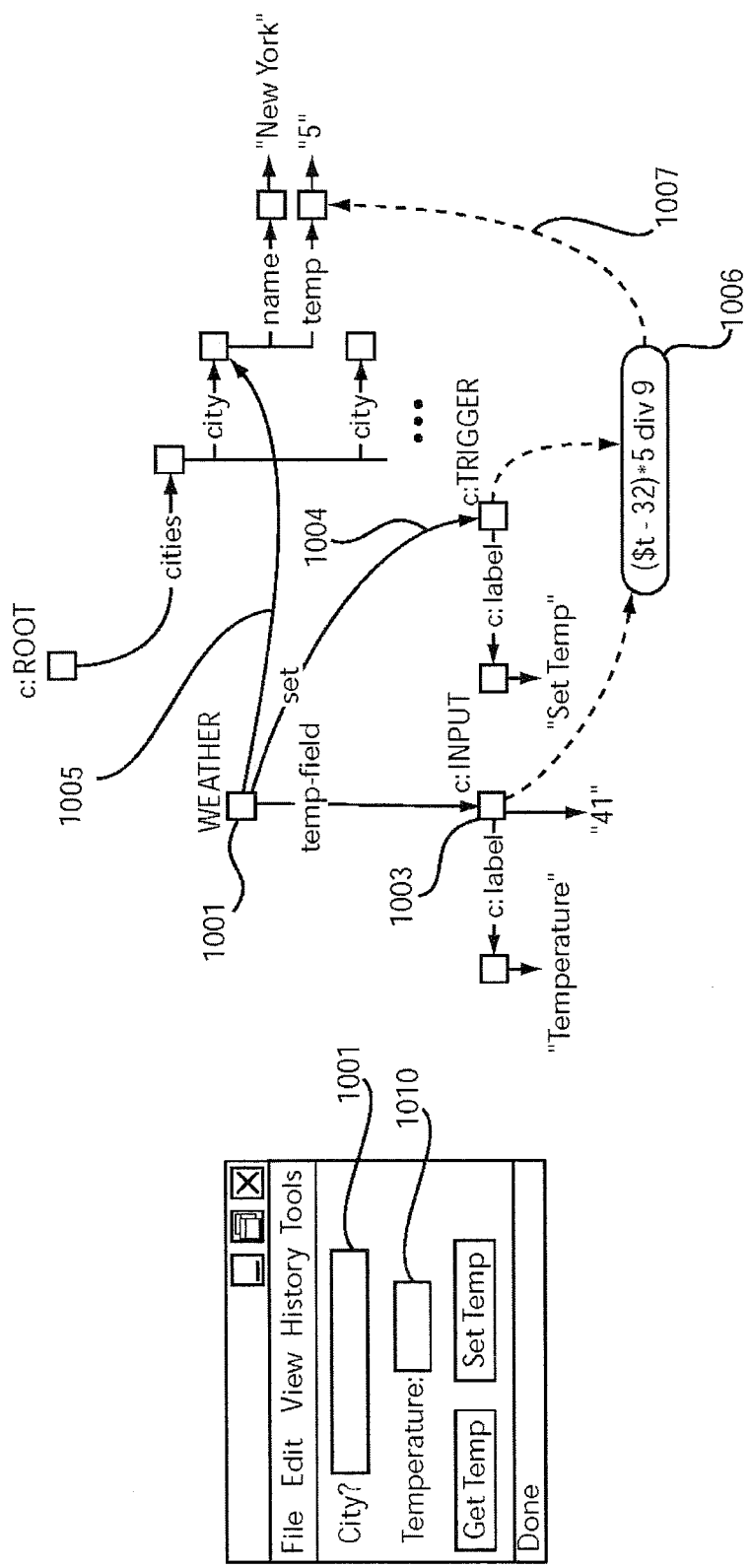
FIG. 16 is a diagram showing an example in accordance with the present principles for updating and querying a relational database of weather information.

Referring to FIG. 16, a <c:create> construct is used to create and associate user interface elements such as inputs 1003 and triggers 1004 with the WEATHER resource class 1001 that represents the form:

```
<c:with anchor="WEATHER">
    <c:create class="c:INPUT" property="city-field">
        <c:out path="c:label">City?</c:out>
    </c:create>
    <c:create class="c:INPUT" property="temp-field"> <! -1003 ->
        <c:outpath="c:label">Temperature:</c:out>
    </c:create>
    <c:create class="c:TRIGGER"<c:out property="get">
        </c:out path="c:label">Get Temp</c:out>
    </c:create>
    <c:create class="c:TRIGGER" property="set"> <!-1004->
        <c:out path="c:label">Set Temp</c:out>
    </c:create>
</c:with>
```

The <c:let> construct 1005 uses the "city" input field to select a row from the databases recording it using the "selected" property.

```
<c:let
    anchor="WEATHER"
    property="selected"
    path="/cities/city[name/tex( )=$anchor/city-field/text( )]"
/>
```

The <c:bind> construct 1006, triggered by the set trigger 1004, updates the database with the quantity in a temperature input field 1010, after converting Fahrenheit to Celsius. A similar <c:bind> construct retrieves the temperature from the database, converting Celsius to Fahrenheit.

```
<c:bind anchor="WEATHER">    <!-1006 ->
    <c:in path="set"/>
    <c:in path="temp-field" variable="$temp" version="old"
    passive="true"/>
    <c:out path="selected/temp">{($temp - 32) * 5 div 9}
    </c:out>
</c:bind>
```

Figure 17:
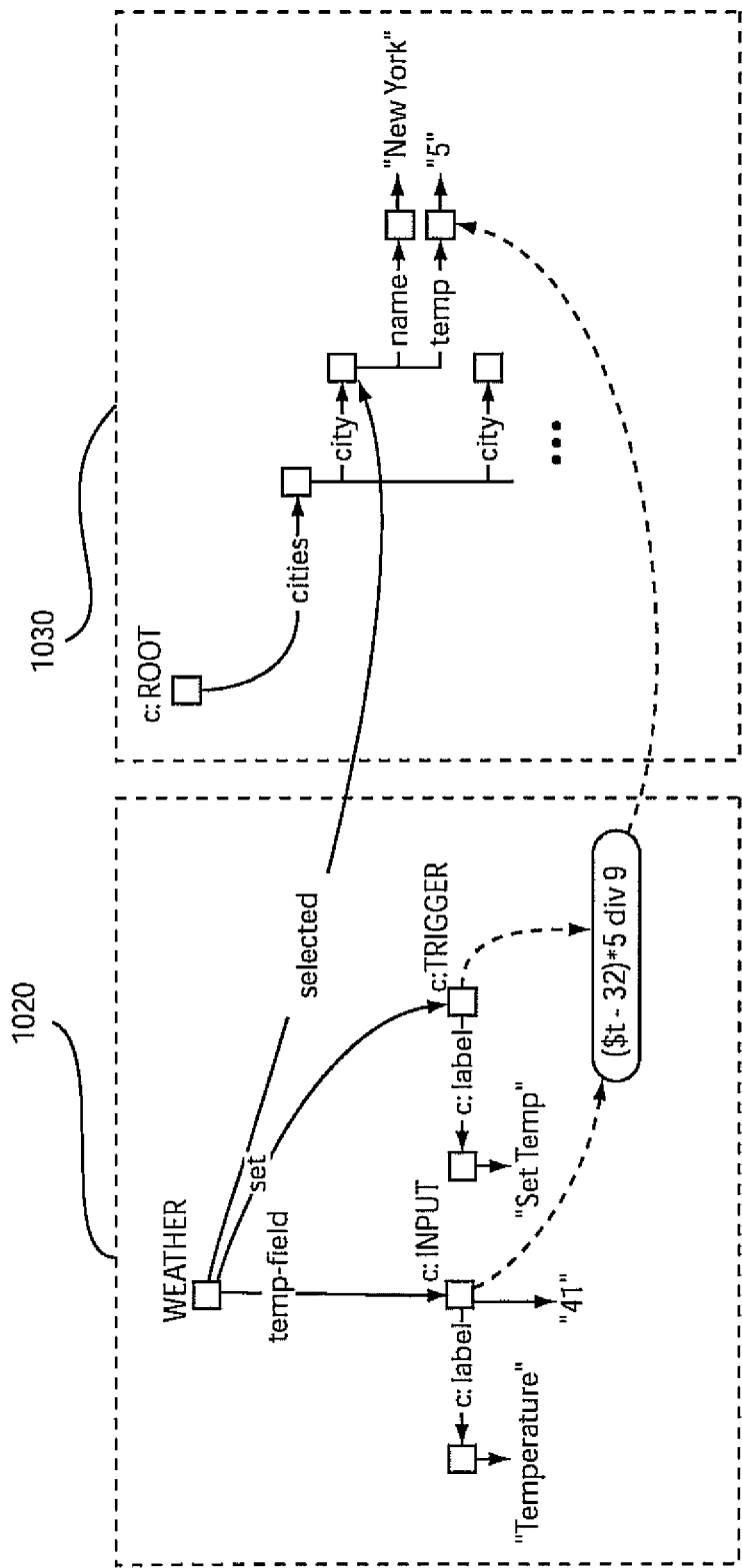
FIG. 17 is a diagram showing the example of FIG. 16 implemented on different nodes.

FIG. 16 gives no indication of the physical distribution of computing components, and the application code is largely independent of that. A typical deployment scenario is illustrated in FIG. 17, where the dashed boxes represent computing nodes 1020 and 1030.

Distributed data structures are formed by triples that connect resources with URLs residing on different computing nodes, such as 1005. Distributed execution occurs when <c:bind> constructs that reference distributed data structures are executed, such as 1006 and 1007.

Referring again to FIG. 10, a <c:let> construct is illustratively depicted.

```
<c:let
    anchor="A"
    path="xpath"
    property="p"
    class="C1 C2 . . ." value="value-flag">
    <c:let/>
    <c:create/>
    <c:bind/>
</c:let>
```

A <c:let> construct manages a set of triples and classifications. The semantics of <c:let> can be described as follows: for every resource R of class A, for every resource S reachable by xpath from R classify S with classes C1, C2, . . . connect R to S with a triple having predicate p. The existence of the triple connecting R to S with property p, and the classification of S with classes C1, C2, . . . are dependent on the classification of R class A, and the reachability of S from R via xpath. If those preconditions subsequently become false, then the triple connecting R to S with property p is removed, and the classification of S with classes C1, C2, . . . is removed.

The default for the anchor attribute is the anchor class defined by the enclosing <c:unit>, <c:with>, <c:let>, or <c:create> construct. Each <c:let> construct provides a default anchor class for constructs that it encloses which is a unique anonymous class CL associated with and uniquely identifying that instance of the <c:let> construct. This anonymous class CL is applied to resource S along with the explicitly specified classes C1, C2, . . . .

The default if no class is specified is just the unique anonymous class CL. The default if no property is specified is an anonymous property unique to each instance of the <c:let> construct.

Figure 18:
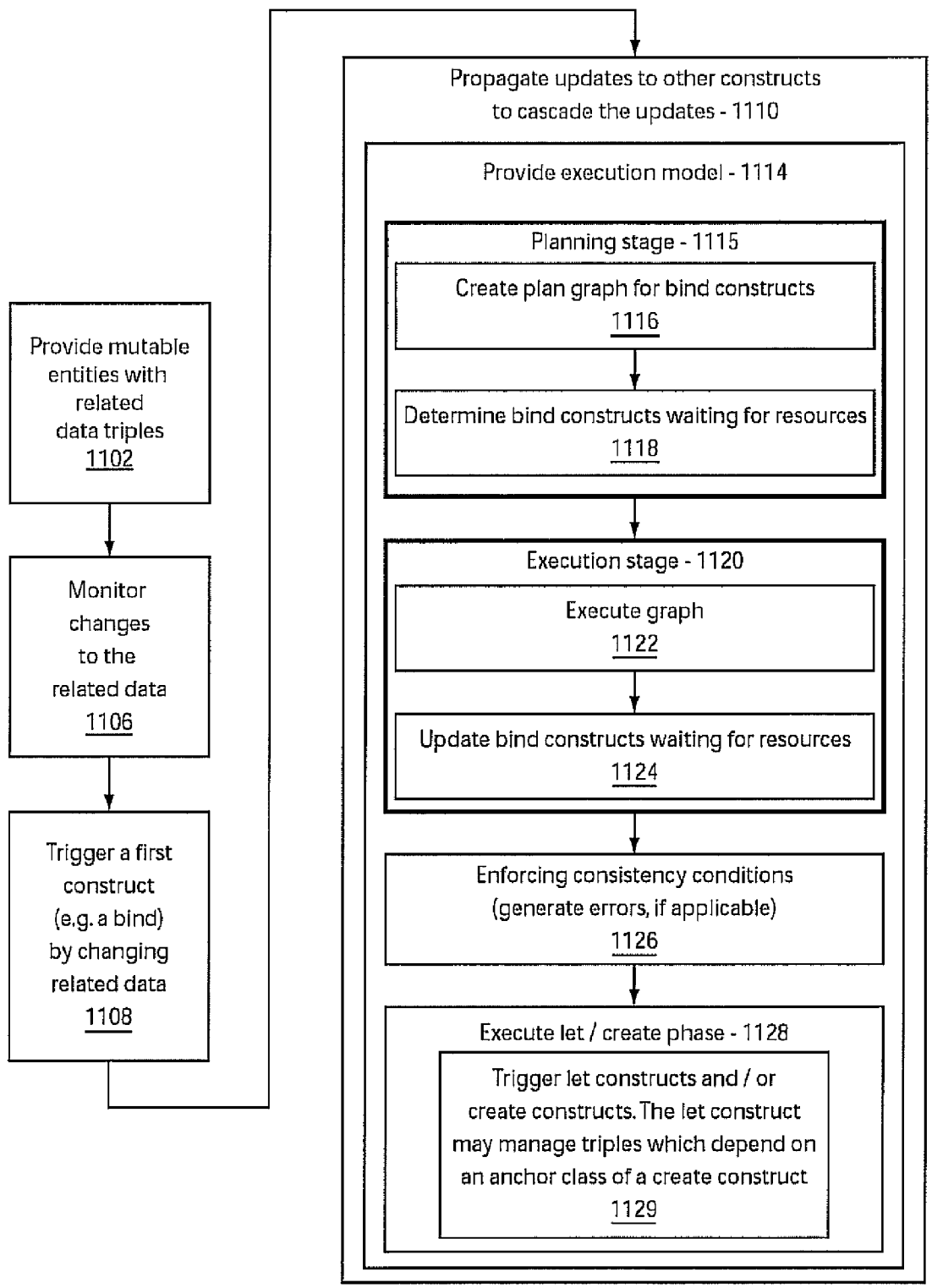
FIG. 18 is a block/flow diagram showing a system/method for managing resources with atomic/isolated cascading in accordance with one embodiment.

Referring to FIG. 18, a block/flow diagram showing a system/method for managing resources in a programming environment is illustratively shown. In block 1102, mutable entities including related data including triples are provided. Triples are employed in a plurality of roles in an application to support, e.g., enterprise, web and client applications.

In block 1106, changes in the related data are listened for or monitored. In block 1108, a first construct is triggered in accordance with the changes in the related data to update the mutable entities. This may include specifying how a value of a mutable entity changes in response to the changes in the related data. The first construct preferably includes a bind construct with access to old and new values for the related data to determine the mutable entity changes. Changes in the related data are preferably declared active to trigger the first construct.

In block 1110, updates are propagated from the first construct to other constructs such that a cascade of updates occurs. The cascade of updates is executed concurrently such that the updates are propagated to completion and are executed all at once relative to other cascades of executing constructs. This helps to maintain consistency across a program or application.

Within the scope of its cascade, the initiating update appears to be spontaneous and independent of updates in other cascades. There are many independent sources of initiating updates (people, internal, external systems). Therefore, the cascade executions triggered by such spontaneous, independent initiating updates could potentially interfere with each other. This is prevented in Collage by requiring that each cascade run to completion, and appear to be executed all at once, relative to other cascades. Because the executions of different cascades do not interleave, they are said to be isolated. Note that all that is needed is that the cascades run as if they were isolated; insofar as the cascades do not in fact interfere by reading and updating shared resources, the system may execute the cascades concurrently.

In block 1114, bind constructs are employed to manage resources in accordance with an execution model that includes a planning stage 1115. In the planning stage, in block 1116, a plan graph is created using pending bind constructs to be updated in accordance with a trigger event. In block 1118, bind constructs in the graph waiting for resources in accordance with the update are determined.

In block 1120, the execution model includes an execution stage. In the execution stage, in block 1122, the graph is executed, and bind constructs waiting for resources are updated as the updates become available, in block 1124.

In block 1126, executing the cascade of updates includes enforcing consistency conditions in a bind phase such that an error is generated if at least one of the following occurs: upon termination of the bind phase a relevant bind has not executed; if more than one bind instance updates a resource value, all values for different bind instances do not agree; and a bind instance that was executed is subsequently removed.

In block 1128, the execution model includes a let/create phase, and let constructs and create constructs are processed to update constructs whose prerequisites have changed during the execution stage. In block 1129, in accordance with the updated mutable entities, a second construct or a third construct may be triggered to respectively create a new mutable entity or update a data relationship. The second construct is preferably a create construct which creates new mutable entities by creating new triples based on current entity values. The third construct preferably includes a let construct. The let construct manages a set of triples and classifications of resources. Each triple can depend on the classification of a particular resource with an anchor class of a create construct.

Having described preferred embodiments of a system and method for managing resources using a compositional programming model (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for managing resources in a programming environment, comprising:
providing mutable entities including related data including triples;
listening for changes in the related data;
triggering a first construct in accordance with the changes in the related data to update the mutable entities;
propagating updates from the first construct to other constructs such that a cascade of updates occurs; and
executing the cascade of updates concurrently, where the updates are propagated to completion and are executed all at once relative to other cascades of executing constructs, wherein the cascade of updates and the other cascades are isolated from each other such that cascades do not interfere with each other by reading and/or updating shared resources.

2. The method as recited in claim 1, further comprising employing triples in a plurality of roles in an application to support enterprise, web and client applications.

3. The method as recited in claim 1, wherein triggering a first construct includes specifying how a value of a mutable entity changes in response to the changes in the related data.

4. The method as recited in claim 1, wherein the first construct includes a bind construct with access to old and new values for the related data to determine the mutable entity changes.

5. The method as recited in claim 1, wherein changes in the related data are declared active to trigger a first construct.

6. The method as recited in claim 1, further comprising:
in accordance with the updated mutable entities, triggering at least one of a second construct and a third construct to respectively create a new mutable entity and update a data relationship.

7. The method as recited in claim 6, wherein the second construct is a create construct which creates new mutable entities by creating new triples based on current entity values.

8. The method as recited in claim 1, wherein resources are managed using bind constructs in accordance with an execution model that includes a planning stage and an execution stage, the method further comprising:
in the planning stage, creating a plan graph using pending bind constructs to be updated in accordance with a trigger event;
determining bind constructs in the graph waiting for resources in accordance with the update; and
in the execution stage, executing the graph and updating bind constructs waiting for resources as the updates become available.

9. The method as recited in claim 1, wherein the cascade of updates and the other cascades are triggered by independent initiating updates.

10. The method as recited in claim 8, wherein executing the cascade of updates includes enforcing consistency conditions in a bind phase such that an error is generated if at least one of the following occurs:
- upon termination of the bind phase a relevant bind has not executed;
- if more than one bind instance updates a resource value, all values for different bind instances do not agree; and
- a bind instance that was executed is subsequently removed.

11. The method as recited in claim 8, wherein the execution model includes a let/create phase and the method further comprises processing let constructs and create constructs to update constructs whose prerequisites have changed during the execution stage.

12. The method as recited in claim 1, further comprising managing a set of triples and classifications of resources using a let construct.

13. The method as recited in claim 12, wherein each triple depends on the classification of a particular resources with an anchor class of a create construct.

14. A non-transitory computer readable storage medium comprising a computer readable program for managing resources in a programming environment, wherein the computer readable program when executed on a computer causes the computer to perform the steps of:
- providing mutable entities including related data including triples;
- listening for changes in the related data;
- triggering a first construct in accordance with the changes in the related data to update the mutable entities;
- propagating updates from the first construct to other constructs such that a cascade of updates occurs; and
- executing the cascade of updates concurrently, where the updates are propagated to completion and are executed all at once relative to other cascades of executing constructs, wherein the cascade of updates and the other cascades are isolated from each other such that cascades do not interfere with each other by reading and/or updating shared resources.

15. The non-transitory computer readable storage medium as recited in claim 14, wherein an execution model includes the planning stage, the planning stage further comprising:
- determining bind constructs in the graph waiting for resources in accordance with the update.

16. The non-transitory computer readable storage medium as recited in claim 15, wherein the execution model includes the execution stage, the execution stage further comprising:
- updating bind constructs waiting for resources as the updates become available.

17. The non-transitory computer readable storage medium as recited in claim 14, wherein executing the cascade of updates includes enforcing consistency conditions in a bind phase such that an error is generated if at least one of the following occurs:
- upon termination of the bind phase a relevant bind has not executed;
- if more than one bind instance updates a resource value, all values for different bind instances do not agree; and
- a bind instance that was executed is subsequently removed.

18. The non-transitory computer readable storage medium as recited in claim 17, wherein the execution model includes a let/create phase and the method further comprises processing let constructs and create constructs to update constructs whose prerequisites have changed during the execution stage.

19. The non-transitory computer readable storage medium as recited in claim 14, further comprising managing a set of triples and classifications of resources using a let construct.

20. The non-transitory computer readable storage medium as recited in claim 19, wherein each triple depends on the classification of a particular resources with an anchor class of a create construct.

* * * * *